US009826116B2

(12) United States Patent
Park et al.

(10) Patent No.: US 9,826,116 B2
(45) Date of Patent: Nov. 21, 2017

(54) IMAGE FORMING APPARATUS SUPPORTING PEER TO PEER CONNECTION AND METHOD OF PERFORMING IMAGE FORMING OPERATION THEREOF

(71) Applicant: S-PRINTING SOLUTION CO., LTD., Suwon-si, Gyeonggi-do (KR)

(72) Inventors: Hyun-wook Park, Suwon-si (KR); Jin-hyung Kim, Suwon-si (KR); Sung-joon Park, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/471,611

(22) Filed: Aug. 28, 2014

(65) Prior Publication Data

US 2014/0368882 A1 Dec. 18, 2014

Related U.S. Application Data

(63) Continuation of application No. 13/712,256, filed on Dec. 12, 2012, now Pat. No. 8,848,228.

(Continued)

(51) Int. Cl.
*G06F 3/12* (2006.01)
*G06K 15/00* (2006.01)
(Continued)

(52) U.S. Cl.
CPC ....... *H04N 1/32797* (2013.01); *G06F 3/1204* (2013.01); *G06F 3/1236* (2013.01);
(Continued)

(58) Field of Classification Search
None
See application file for complete search history.

(56) References Cited

U.S. PATENT DOCUMENTS 7,634,801 B2    12/2009  Kizawa
8,494,502 B2     7/2013  Abel et al.
(Continued)

FOREIGN PATENT DOCUMENTS

CN    101185253    5/2008
CN    101770665    7/2010
(Continued)

OTHER PUBLICATIONS

International Search Report dated Mar. 25, 2013 issued in International Application No. PCT/KR2012/010807.
(Continued)

*Primary Examiner* — Thomas Lett
(74) *Attorney, Agent, or Firm* — Staas & Halsey LLP

(57) ABSTRACT

A method of performing an image forming operation in an image forming apparatus supporting peer to peer (P2P) connection includes P2P connecting the image forming apparatus to an external wireless device while the image forming apparatus is wirelessly connected to an access point (AP) of an infrastructured network, receiving a discovery packet from the wireless device via a P2P interface, transmitting to the wireless device a response packet including an Internet protocol (IP) address of the P2P interface, receiving from the wireless device an image forming operation performing request having the IP address of the P2P interface as a destination, and performing the requested image forming operation.

27 Claims, 20 Drawing Sheets

Related U.S. Application Data

(60) Provisional application No. 61/569,391, filed on Dec. 12, 2011.

(51) Int. Cl.
    *G06F 7/00*     (2006.01)
    *H04N 1/327*     (2006.01)
    *H04W 76/02*     (2009.01)
    *H04N 1/00*     (2006.01)
    *H04W 8/00*     (2009.01)

(52) U.S. Cl.
CPC .......... *G06F 3/1292* (2013.01); *G06F 3/1296* (2013.01); *G06K 15/00* (2013.01); *G06K 15/4005* (2013.01); *G06K 15/4045* (2013.01); *H04N 1/00204* (2013.01); *H04N 1/00214* (2013.01); *H04N 1/00307* (2013.01); *H04N 1/00954* (2013.01); *H04W 8/005* (2013.01); *H04W 76/023* (2013.01); *H04W 76/025* (2013.01); *H04N 2201/0015* (2013.01); *H04N 2201/0039* (2013.01); *H04N 2201/0041* (2013.01); *H04N 2201/0055* (2013.01); *H04N 2201/0094* (2013.01); *Y02B 60/1271* (2013.01)

(56) References Cited

U.S. PATENT DOCUMENTS

| | | | |
|---|---|---|---|
| 8,621,071 B1 | 12/2013 | Scofield et al. | |
| 8,625,488 B1* | 1/2014 | Gogate et al. | 370/328 |
| 8,749,823 B2 | 6/2014 | Kato | |
| 8,873,468 B1* | 10/2014 | Gogate et al. | 370/328 |
| 8,929,822 B2 | 1/2015 | Jung et al. | |
| 8,947,712 B2 | 2/2015 | Arai | |
| 9,100,442 B2 | 8/2015 | Park | |
| 9,313,315 B2 | 4/2016 | Choi et al. | |
| 2003/0149778 A1 | 8/2003 | Robinson et al. | |
| 2003/0156567 A1* | 8/2003 | Oak | 370/338 |
| 2004/0176134 A1 | 9/2004 | Goldthwaite et al. | |
| 2005/0130647 A1* | 6/2005 | Matsuda | G06F 3/1203 455/426.2 |
| 2005/0146744 A1* | 7/2005 | McAllister | H04N 1/00244 358/1.15 |
| 2005/0147049 A1 | 7/2005 | Ganesan | |
| 2005/0279833 A1* | 12/2005 | Tanaka | H04N 1/00278 235/462.46 |
| 2006/0206592 A1* | 9/2006 | Fujii | H04W 48/16 709/220 |
| 2007/0139693 A1* | 6/2007 | Lodolo | H04L 67/104 358/1.15 |
| 2008/0063002 A1 | 3/2008 | Zheng et al. | |
| 2008/0225331 A1* | 9/2008 | Jung | G06F 3/1209 358/1.15 |
| 2008/0288936 A1 | 11/2008 | Ikeda | |
| 2009/0017843 A1 | 1/2009 | Laroia et al. | |
| 2009/0052348 A1 | 2/2009 | Kato | |
| 2010/0082490 A1 | 4/2010 | Rosenblatt et al. | |
| 2010/0322213 A1 | 12/2010 | Liu et al. | |
| 2011/0010246 A1 | 1/2011 | Kasslin et al. | |
| 2011/0026504 A1 | 2/2011 | Feinberg | |
| 2011/0063663 A1 | 3/2011 | Kim et al. | |
| 2011/0082905 A1 | 4/2011 | Wentink et al. | |
| 2011/0082939 A1 | 4/2011 | Montemurro et al. | |
| 2011/0082940 A1 | 4/2011 | Montemurro et al. | |
| 2011/0085529 A1 | 4/2011 | Choi et al. | |
| 2011/0096354 A1* | 4/2011 | Liu | G06F 3/1204 358/1.15 |
| 2011/0185183 A1 | 7/2011 | Yamamoto | |
| 2011/0225305 A1 | 9/2011 | Vedantham et al. | |
| 2011/0231922 A1 | 9/2011 | Azuma | |
| 2011/0292425 A1 | 12/2011 | Lee | |
| 2012/0034868 A1 | 2/2012 | Fine | |
| 2012/0224569 A1 | 9/2012 | Kubota | |
| 2013/0044635 A1 | 2/2013 | Suzuki | |
| 2013/0057897 A1 | 3/2013 | Park et al. | |
| 2013/0057898 A1 | 3/2013 | Park et al. | |
| 2013/0215467 A1 | 8/2013 | Fein et al. | |
| 2013/0229685 A1 | 9/2013 | Naruse | |
| 2013/0258402 A1 | 10/2013 | Arai | |
| 2014/0047038 A1* | 2/2014 | Piratla et al. | 709/206 |
| 2014/0347170 A1 | 11/2014 | Gui et al. | |
| 2015/0055174 A1 | 2/2015 | Baba | |
| 2015/0172924 A1 | 6/2015 | Hirano | |
| 2017/0026783 A1 | 1/2017 | Asakura | |

FOREIGN PATENT DOCUMENTS

| | | |
|---|---|---|
| CN | 202019354 | 10/2011 |
| CN | 102356627 | 2/2012 |
| CN | 102891706 | 1/2013 |
| CN | 103369171 | 10/2013 |
| CN | 103577849 | 2/2014 |
| EP | 2 239 924 | 10/2010 |
| EP | 2390782 | 11/2011 |
| EP | 2 645 691 A2 | 10/2013 |
| EP | 2 811 720 A2 | 12/2014 |
| EP | 2 840 529 A1 | 2/2015 |
| KR | 10-2005-0073509 | 7/2005 |
| KR | 1020110040025 | 4/2011 |
| KR | 2011-0096831 | 8/2011 |
| KR | 10-2013-0025745 | 3/2013 |
| KR | 10-2013-0025747 | 3/2013 |
| KR | 10-2013-0025749 | 3/2013 |
| WO | 2009009394 | 1/2009 |

OTHER PUBLICATIONS

Extended European Search Report dated May 17, 2013 issued in EP Application No. 12196634.5.
Extended European Search Report dated May 24, 2013 issued in EP Application No. 12196808.5.
Extended European Search Report dated May 24, 2013 issued in EP Application No. 12196617.0.
European Office Action dated Oct. 7, 2014 in European Patent Application No. 12196617.0.
"UPnP Device Architecture 1.0", XP002521777, Document Revision Date Jul. 20, 2006, pp. 1-80.
Inventek Systems, "eS-WiFi Module Application Note AN20052", Software Enabled Access Point (SoftAP) Functionality, 2012, 12 pages.
Notice of Allowance dated May 28, 2014 in U.S. Appl. No. 13/712,256.
European Search Report dated May 22, 2015 in corresponding European Patent Application No. 15150424.8.
European Communication dated Jun. 10, 2015 in corresponding European Patent Application No. 15150424.8.
Extended European Search Report dated Feb. 8, 2016 from European Patent Application No. 15162047.3, 6 pages.
"Near Field Communication — Interface and Protocol (NFCI P-1)", ECMA General Assembly, 3$^{rd}$ Edition, XP055119636, Jun. 11, 2013, 52 pages.
Extended European Search Report dated Jul. 7, 2016 from European Patent Application No. 16166088.1, 5 pages.
Wi-Fi Certified Wi-Fi Direct, "Personal, portable Wi-Fi to connect devices anywhere, anytime", Wi-Fi Alliance, Oct. 2010, 6 pages.
Chinese Office Action dated Aug. 31, 2016 from Chinese Patent Application No. 201510013206.2, 20 pages.
U.S. Notice of Allowance dated Jun. 8, 2017 from U.S. Appl. No. 15/239,391.
Wi-Fi Peer-to-Peer (P2P) Technical Specification v1.2, Wi-Fi Alliance Technical Committee P2P Task Group, 2010 WiFi Alliance, 159 pages.
U.S. Notice of Allowance dated Feb. 20, 2015 from U.S. Appl. No. 13/712,138.
U.S. Office Action dated Apr. 24, 2014 from U.S. Appl. No. 13/712,138.
U.S. Notice of Allowance dated Apr. 13, 2015 from U.S. Appl. No. 13/712,220.

(56) References Cited

OTHER PUBLICATIONS

U.S. Notice of Allowance dated Oct. 6, 2015 from U.S. Appl. No. 13/712,220.
U.S. Office Action dated Apr. 23, 2014 from U.S. Appl. No. 13/712,220.
U.S. Notice of Allowance dated Jan. 15, 2016 from U.S. Appl. No. 13/712,220.
U.S. Office Action dated Mar. 28, 2016 from U.S. Appl. No. 14/592,483.
U.S. Notice of Allowance dated Sep. 22, 2015 from U.S. Appl. No. 14/676,182.
U.S. Office Action dated Jun. 3, 2015 from U.S. Appl. No. 14/676,182.
U.S. Notice of Allowance dated May 18, 2016 from U.S. Appl. No. 14/686,263.
U.S. Office Action dated Jul. 30, 2015 from U.S. Appl. No. 14/686,263.
U.S. Office Action dated Feb. 12, 2016 from U.S. Appl. No. 14/686,263.
U.S. Office Action dated Oct. 13, 2016 from U.S. Appl. No. 15/239,391.
U.S. Appl. No. 13/712,138 (now U.S. Pat. No. 9,036,169), filed Dec. 12, 2012, Sung-joon Park, Samsung Electronics Co., Ltd.
U.S. Appl. No. 13/712,220 (U.S. Pat. No. 9,357,094), filed Dec. 12, 2012, Sung-joon Park, Samsung Electronics Co., Ltd.
U.S. Appl. No. 13/712,256 (U.S. Pat. No. 8,848,228), filed Dec. 12, 2012, Hyun-wook Park, Samsung Electronics Co., Ltd.
U.S. Appl. No. 14/592,483, filed Jan. 8, 2015, Chang-jung Yun, Samsung Electronics Co., Ltd.
U.S. Appl. No. 14/676,182 (U.S. Pat. No. 9,256,386), filed Apr. 1, 2015, Jae-in Lee, Samsung Electronics Co., Ltd.
U.S. Appl. No. 14/686,263 (U.S. Pat. No. 9,483,223), filed Apr. 14, 2015, Sung-joon Park, Samsung Electronics Co., Ltd.
U.S. Appl. No. 15/239,391, filed Aug. 17, 2015, Sung-joon Park, Samsung Electronics Co., Ltd.
Chinese Office Action dated Apr. 19, 2017 from Chinese Patent Application No. 201510013206.2, 23 pages.
Chinese Office Action dated Aug. 3, 2017 from Chinese Patent Application No. 201510154817.9, 16 pages.
Chinese Office Action dated Sep. 13, 2017 from Chinese Patent Application No. 201510013206.2, 20 pages.

\* cited by examiner

IMAGE FORMING APPARATUS SUPPORTING PEER TO PEER CONNECTION AND METHOD OF PERFORMING IMAGE FORMING OPERATION THEREOF

CROSS-REFERENCE TO RELATED APPLICATIONS

This is a Continuation Application of prior application Ser. No. 13/712,256, filed on Dec. 12, 2012, which claims priority under 35 U.S.C. §120 from U.S. Provisional Patent Application No. 61/569,391, filed on Dec. 12, 2011, in the U.S. Patent and Trademark Office, the disclosure of which is incorporated herein in its entirety by reference.

BACKGROUND

1. Field

The present general inventive concept relates to an image forming apparatus supporting peer to peer (P2P) connection, and more particularly, to a method of performing an image forming operation requested by a wireless device P2P connected to an image forming apparatus.

2. Description of the Related Art

Recently, peer to peer (P2P) communication technology, by which wireless devices may be directly connected to each other without an additional wireless connecting apparatus, have become generalized and widely used. For example, Bluetooth technology makes the P2P communication possible. Although there are limitations in terms of transmission speed and transmission range of Bluetooth, new versions of Bluetooth are being developed to compensate for the limitations.

In addition, Wi-Fi, which is a wireless local area network (WLAN) standard based on IEEE 802.11 regulated by the Wi-Fi alliance, is basically a technology using ultra-high speed Internet by accessing access points (APs) connected to an infrastructured network. The Wi-Fi may serve the P2P communication by using an ad-hoc function. An ad hoc network typically refers to any set of networks where all devices have equal status on a network and are free to associate with any other ad hoc network devices in link range. Very often, ad hoc network refers to a mode of operation of IEEE 802.11 wireless networks. However, when the ad-hoc function is used, security is weakened, a transmission speed is lowered, a setting method is not easily performed, and transmission range is limited to a maximum of 20 meters. Therefore, the Wi-Fi alliance has suggested a Wi-Fi Direct technology that makes the P2P communication possible. The Wi-Fi Direct allows P2P connection between wireless devices without using the AP, supports a transmission speed of a maximum of 250 Mbps, and performs security settings by using Wi-Fi protected access 2 (WPA2), in order to address problems of the ad-hoc function. In addition, the Wi-Fi Direct supports a transmission range of a maximum of 200 meters, and thus, is considered as a substitute for the P2P communication.

As described above, with the appearance of the Wi-Fi Direct, it is considered that utilization of the P2P communication is increased more. In addition, the P2P communication technology may be also applied to image forming apparatuses such as printers, scanners, facsimiles, and multi-function printers. Therefore, technologies for safely and conveniently using image forming apparatuses supporting the P2P connection are necessary.

SUMMARY

The present general inventive concept provides an image forming apparatus supporting peer to peer (P2P) connection and a method of performing an image forming operation requested by a wireless device P2P connected to an image forming apparatus.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of performing an image forming operation in an image forming apparatus supporting peer to peer (P2P) connection, the method including P2P connecting the image forming apparatus to an external wireless device while the image forming apparatus is wirelessly connected to an access point (AP) of an infrastructured network, receiving a discovery packet from the wireless device via a P2P interface, transmitting to the wireless device a response packet including an Internet protocol (IP) address of the P2P interface, receiving from the wireless device an image forming operation performing request having the IP address of the P2P interface as a destination, and performing the requested image forming operation.

The receiving of the discovery packet may include receiving via the P2P interface the discovery packet transmitted from the wireless device by using a multicast or broadcast method.

The transmitting of the response packet may include transmitting the response packet further comprising information on services providable by the image forming apparatus.

The P2P connection may be Wi-Fi Direct connection, and the P2P connecting of the image forming apparatus may include P2P connecting the image forming apparatus to operate the image forming apparatus as a group owner (GO) and to operate the wireless device as a client.

The receiving of the discovery packet may be performed by using any one protocol from among bonjour, universal plug & play (UPNP), web server director (WSD), service location protocol (SLP), and simple network management protocol (SNMP).

If the image forming operation is a print operation, the receiving of the image forming operation performing request may include receiving from the wireless device print data having the IP address of the P2P interface as a destination, and wherein the performing of the image forming operation may include performing a print operation according to the print data.

If the image forming operation is a scan operation, the receiving of the image forming operation performing request may include receiving from the wireless device a scan request having the IP address of the P2P interface as a destination, and wherein the performing of the image forming operation may include scanning document and transmitting scan image data to the wireless device.

The foregoing and/or other features and utilities of the present general inventive concept may also be achieved by providing a non-transitory computer readable recording medium having recorded thereon computer-readable codes to execute a method of performing an image forming operation in an image forming apparatus supporting peer to peer (P2P) connection, the method including P2P connecting the image forming apparatus to an external wireless device while the image forming apparatus is wirelessly connected to an access point (AP) of an infrastructured network, receiving a discovery packet from the wireless device via a P2P interface, transmitting to the wireless device a response packet comprising an Internet protocol (IP) address of the P2P interface, receiving from the wireless device an image forming operation performing request having the IP address of the P2P interface as a destination, and performing the requested image forming operation.

The foregoing and/or other features and utilities of the present general inventive concept may also be achieved by providing an image forming apparatus supporting peer to peer (P2P) connection, the image forming apparatus including a wireless local area network (WLAN) interface unit to wirelessly connect the image forming apparatus to an infrastructured network and to P2P connect the image forming apparatus to an external wireless device, an Internet protocol (IP) address management unit to manage an IP address of a P2P interface and an IP address of an infrastructured network interface, a control unit to receive an IP address from the IP address management unit and to control performing of an image forming operation requested by the wireless device, and an image forming operation performing unit to perform the requested image forming operation under control of the control unit, wherein, if a discovery packet is received from the wireless device via the P2P interface, the control unit generates and transmits a response packet including the IP address of the P2P interface to the wireless device, and wherein, if an image forming operation performing request is received from the wireless device via the P2P interface, the control unit controls the image forming operation performing unit to perform the requested image forming operation.

The WLAN interface unit may receive via the P2P interface the discovery packet transmitted from the wireless device by using a multicast or broadcast method.

The control unit may generate the response packet to further include information on services providable by the image forming apparatus.

The P2P connection may be Wi-Fi Direct connection, and the WLAN interface unit P2P may connect the image forming apparatus to operate the image forming apparatus as a group owner (GO) and to operate the wireless device as a client.

The WLAN interface unit may receive the discovery packet from the wireless device by using any one protocol from among bonjour, universal plug & play (UPNP), web server director (WSD), service location protocol (SLP), and simple network management protocol (SNMP).

If the image forming operation is a print operation, the control unit may control the image forming operation performing unit to perform a print operation according to the received print data if print data having the IP address of the P2P interface as a destination is received from the wireless device.

If the image forming operation is a scan operation, the control unit may control the image forming operation performing unit to scan document and transmits scan image data to the wireless device if a scan request having the IP address of the P2P interface as a destination is received from the wireless device.

The foregoing and/or other features and utilities of the present general inventive concept may also be achieved by providing an image forming apparatus supporting peer to peer (P2P) connection, the image forming apparatus including a wireless local area network (WLAN) interface unit to concurrently establish an infrastructure network connection and a P2P connection with an external wireless device, a central processing unit (CPU) to provide an Internet protocol (IP) address of a P2P interface corresponding to the P2P connection to the external wireless device in response to an image forming operation requested by the external wireless device if the external wireless device is P2P connected to the image forming apparatus, and an image forming operation performing unit to perform the requested image forming operation based on print data received from the external wireless device if the print data includes the IP address of the P2P interface.

The CPU may include an IP address management unit to manage the IP address of the P2P interface and an IP address of an infrastructured network interface corresponding to the infrastructure network connection, and a control unit to receive the IP address of the P2P interface from the IP address management unit based on the image forming operation requested by the external wireless device and to control performance of the requested image forming operation.

The CPU may send a response packet including the IP address of the P2P interface in response to receiving a discovery packet from the external wireless device, and the CPU may control the image forming operation performing unit to perform the requested image forming operation based on at least one of a plurality of image forming operations provided in the response packet.

The at least one of a plurality of image forming operations may include printing, copying, faxing, and scanning.

The receipt of the discovery packet may prompt the image forming apparatus that the external wireless device is within P2P connection range and is requesting information regarding the plurality of image forming operations provided by the image forming apparatus.

The P2P connection may be a Wi-Fi Direct connection.

The foregoing and/or other features and utilities of the present general inventive concept may also be achieved by providing an image forming apparatus supporting peer to peer (P2P) connection, the image forming apparatus including a wireless local area network (WLAN) interface unit to concurrently establish a plurality of different wireless connections, a central processing unit (CPU) to provide an Internet protocol (IP) address corresponding to one of the wireless connections to an external wireless device if the external wireless device is connected to the image forming apparatus by one of the wireless connections, and an image forming operation performing unit to perform the requested image forming operation based on print data received from the external wireless device if the print data includes the IP address corresponding to the one of the wireless connections.

The plurality of different wireless connections may include an infrastructure network connection and a P2P connection.

The image forming apparatus may establish the infrastructure network connection by at least one of wirelessly connecting the image forming apparatus to an external access point (AP) and determining the image forming apparatus to be an AP.

The WLAN interface unit may determine the image forming apparatus to be the AP by determining the image forming apparatus to be a group owner (GO) from among a plurality of Wi-Fi Direct connected external wireless devices.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
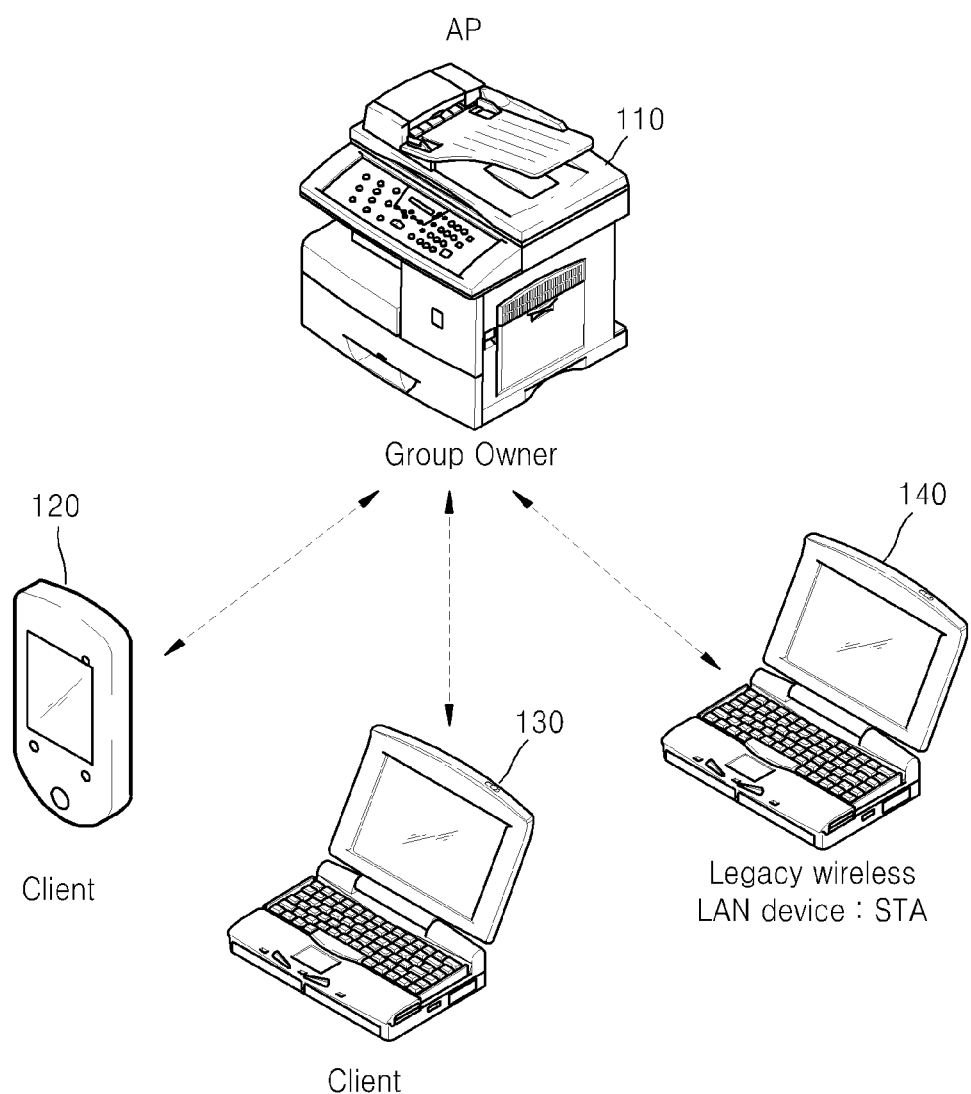
FIG. 1 is a diagram illustrating devices supporting Wi-Fi Direct and legacy wireless local area network (WLAN) devices that are wirelessly connected to each other to form a wireless network, according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Expressions such as "at least one of," when preceding a list of elements, modify the entire list of elements and do not modify the individual elements of the list.

Hereinafter, a multi-function printer (MFP) supporting Wi-Fi Direct will be described as an example of an image forming apparatus supporting peer-to-peer (P2P) connection. However, the scope of the present general inventive concept to be protected is not limited thereto, but is defined by descriptions of claims.

Before describing embodiments of the present general inventive concept, basic connections and operations of an MFP supporting the Wi-Fi Direct will be described with reference to the accompanying drawings.

FIG. 1 is a diagram illustrating wireless local area network (WLAN) devices supporting Wi-Fi Direct and a legacy WLAN device connecting to each other to form a wireless network, according to an exemplary embodiment of the present general inventive concept. Referring to FIG. 1, an MFP 110 supporting the Wi-Fi Direct is wirelessly connected to a smartphone 120 supporting the Wi-Fi Direct, a laptop computer 130 supporting the Wi-Fi Direct, and a legacy WLAN laptop computer 140. Here, the legacy WLAN laptop computer 140 includes a conventional laptop computer that adopts a WLAN technology and does not support the Wi-Fi Direct.

The WLAN device supporting the Wi-Fi Direct (hereinafter, referred to as "Wi-Fi Direct device") may perform P2P connection without using an infrastructured network, unlike conventional devices supporting Wi-Fi. In more detail, according to the conventional Wi-Fi technology, a Wi-Fi device is wirelessly connected to an external router, that is, an access point (AP), and is connected to an infrastructured network that is configured in advance in order to form a wireless network. As such, the Wi-Fi devices, which are wirelessly connected to the AP, function as stations. However, according to Wi-Fi Direct technology, one of the Wi-Fi Direct devices that are to form the wireless network operates as an AP, and the other Wi-Fi Direct devices are wirelessly connected to the Wi-Fi Direct device that operates as the AP to operate as stations. Therefore, the wireless network may be formed between the Wi-Fi direct devices without the AP connected to the infrastructured network. In addition, when the wireless network is formed between the Wi-Fi direct devices, any legacy WLAN devices, such as the Wi-Fi devices or the legacy WLAN laptop computer 140, may recognize the Wi-Fi direct device that operates as the AP to be a compatible AP, and may be wirelessly connected to the Wi-Fi Direct device.

Referring to FIG. 1, the Wi-Fi Direct MFP 110, the Wi-Fi Direct smartphone 120, and the Wi-Fi Direct laptop computer 130, which are the Wi-Fi direct devices, form a wireless network without an external AP connected to the infrastructured network. As described above, the Wi-Fi direct devices may be wirelessly connected to each other to form a P2P group without an external AP connected to the infrastructured network. Here, the Wi-Fi Direct MFP 110 operates as the AP, and the device operating as the AP among the Wi-Fi direct devices is referred to as a group owner (GO) of a P2P group. In addition, the Wi-Fi smartphone 120 and the Wi-Fi Direct laptop computer 130 are wirelessly connected to the GO, that is, the Wi-Fi Direct MFP 110, to operate as the stations, which are referred to as "clients." Furthermore, the legacy WLAN laptop computer 140 that does not support the Wi-Fi Direct also recognizes the GO, that is, the Wi-Fi Direct MFP 110, as the AP, and is wirelessly connected to the GO to be connected to the wireless network formed by the Wi-Fi direct devices.

As illustrated in FIG. 1, the Wi-Fi Direct MFP 110 operates as the GO, but any one of the other Wi-Fi direct devices, that is, the smartphone 120 and the laptop computer 130, may also operate as the GO, and the MFP 110 may operate as the client. Determination of which of the Wi-Fi direct devices is to become the GO is performed by a negotiation process that takes place during Wi-Fi direct connection processes, which will be described in detail later. Additionally, the Wi-Fi direct device may be determined to be the GO by itself before the connection without any negotiation, and the Wi-Fi direct device may be referred to as an autonomous group owner (AGO). In addition, a wireless network formed based on the AGO is referred to as an autonomous P2P group. When the autonomous P2P group is formed, the legacy WLAN device may recognize the AGO as an AP connected to the infrastructured network and may be connected to the AGO.

Although FIG. 1 illustrates an example in which the Wi-Fi direct devices form the P2P group without the external AP connected to the infrastructured network, the Wi-Fi direct devices may operate as the stations by connecting to the AP, if the AP is connected to the infrastructured network.

Hereinafter, wireless connecting processes between the Wi-Fi direct devices and characteristics of the Wi-Fi Direct technology will be described with reference to the accompanying drawings. For convenience of description, an MFP supporting the Wi-Fi Direct (hereinafter, referred to as "Wi-Fi Direct MFP") will be described as an example, but the scope of the present general inventive concept is not limited thereto. As such, exemplary embodiments of the present general inventive concept may also be applied to printers, scanners, facsimiles, or other types of devices supporting the Wi-Fi Direct. In addition, the Wi-Fi Direct is used as an example of the P2P communication method, but other kinds of P2P communication, such as Bluetooth and Zigbee, for example, may also be used within the applicable range of the present general inventive concept.

Figure 2:
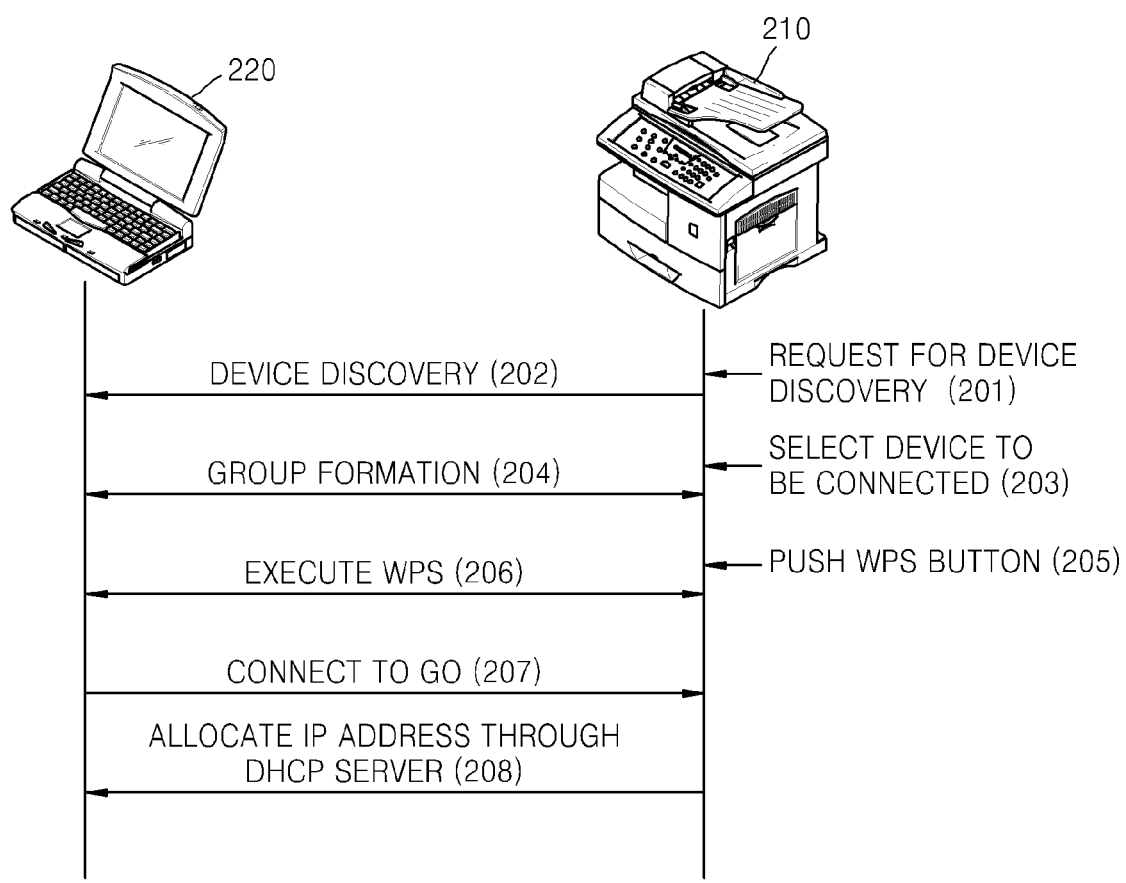
FIG. 2 is a diagram illustrating processes of wirelessly connecting the devices supporting the Wi-Fi Direct to each other, according to an exemplary embodiment of the present general inventive concept.

FIG. 2 is a diagram illustrating processes of wirelessly connecting Wi-Fi Direct devices to each other, according to an exemplary embodiment of the present general inventive concept. In more detail, processes of Wi-Fi Direct connection between a Wi-Fi Direct MFP 210 and a Wi-Fi Direct laptop computer 220 are illustrated. The Wi-Fi Direct connecting processes may be divided as a device discovery process, a group formation process, and a secure connection process. Referring to FIG. 2, the Wi-Fi Direct MFP 210 receives a request to perform device discovery from a user (201), and as a result searches to find a Wi-Fi Direct device that is within a detectable range of the Wi-Fi Direct MFP 210 (202). The device discovery request may be input through a user interface of the MFP 210, for example, a user interface displays on a display unit such as a liquid crystal display (LCD) formed on the MFP 210. If it is determined as a result of searching that there is a Wi-Fi Direct device within the detectable range of the MFP 210, the MFP 210 displays the searched device through the display unit and receives a connection request 203 from the user. The connection request 203 may be also input by the user through the display unit of the MFP 210. More specifically, the user may push buttons or a touch panel of the display unit. If there are a plurality of Wi-Fi Direct devices within the detectable range of the MFP 210, the MFP 210 displays a list of the searched Wi-Fi direct devices on the display unit so that the user may select one of the Wi-Fi direct devices and request the connection to the selected Wi-Fi direct device.

After receiving the connection request 203, a group formation is performed between the Wi-Fi Direct devices to be connected (204). The group formation process determines the Wi-Fi Direct devices to be connected to each other and determines which of the Wi-Fi direct devices are to be the clients within the group, and which one of the Wi-Fi direct devices is to be the GO. The Wi-Fi Direct device to be the GO is determined through the negotiation between the Wi-Fi Direct devices, and the negotiation will be described in detail with reference to FIG. 4.

When the group is formed, the devices included in the group are to be securely connected to each other by using a Wi-Fi protected setup (WPS) technology. The WPS includes a function of performing simple secure connection between the Wi-Fi supporting devices. The WPS may be classified as a personal identification number (PIN) type WPS and a push button configuration (PBC) type WPS. The PIN type WPS sets the secure connection by inputting a PIN code that is set in advance, and the PBC type WPS sets the secure connection by pushing a WPS button that is provided on the Wi-Fi Direct device.

Figure 5:
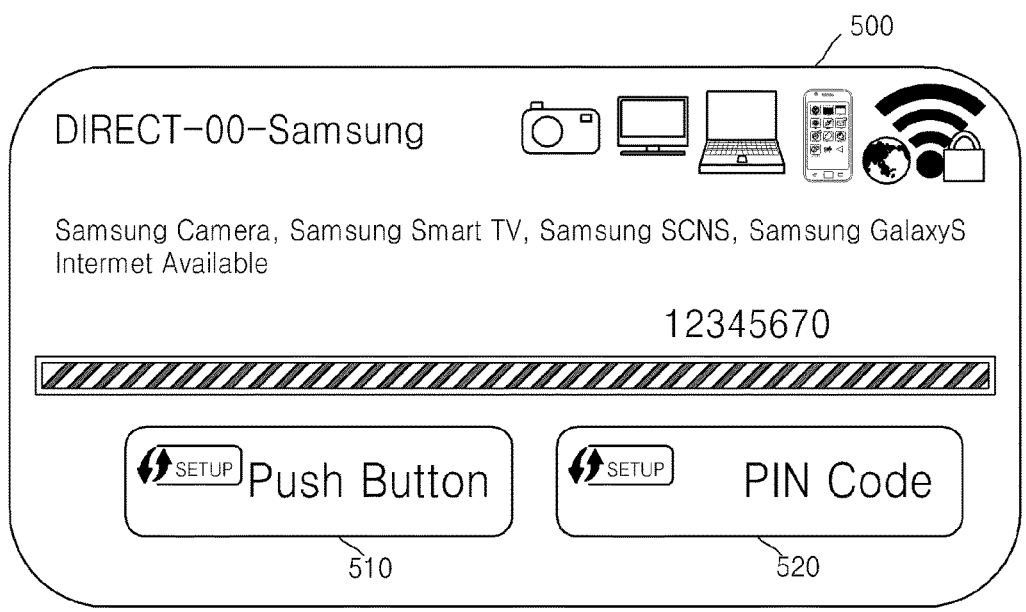
FIG. 5 is a diagram illustrating a display screen to execute a Wi-Fi protected setup (WPS), according to an exemplary embodiment of the present general inventive concept.

Hereinafter, the PBC type WPS will be described as an example. The user pushes a WPS button provided on the MFP 210 to request the secure connection (205). In addition, within a predetermined period of time (e.g., 120 seconds), the secure connection may be achieved by pushing a WPS button formed on the laptop computer 220, or a virtual WPS button displayed on the laptop computer 220 via an application program to perform the Wi-Fi Direct connection. The WPS button displayed on the laptop computer 220 via the application program to perform the Wi-Fi Direct connection in may be an object or any other type of virtual toggle, switch, checkbox, etc., which is displayed on a display unit of the laptop computer 220 by the application program to perform the Wi-Fi Direct connection. An example of the WPS button is represented as a push button 510, as illustrated in FIG. 5. The user clicks may click WPS button represented on the display unit of the laptop computer 220 by using a mouse, for example, to request the secure connection. When the security connection is requested by pushing the WPS button, the device that is determined to be the GO in the group formation process transmits security information to devices that are determined to be the clients (206). According to the Wi-Fi Direct, the secure connection is executed after encrypting in a Wi-Fi protected access 2 (WPA2)-pre-shared key (PSK) method, and thus, the Wi-Fi Direct may have a higher security function than that of a conventional wired equivalent privacy (WEP) or Wi-Fi protected access (WAP) method.

When the WPS is executed, the Wi-Fi direct device that is the client is connected to the Wi-Fi direct device that is the GO (207). At this time, the Wi-Fi Direct device that is the GO automatically allocates an Internet protocol (IP) address to the Wi-Fi direct device that is the client by using a dynamic host configuration protocol (DHCP) server (208), and then, the P2P connection between the Wi-Fi Direct devices is completed.

Basic processes to connect the Wi-Fi direct devices have been described, and detailed processes and characteristics of the Wi-Fi Direct technology will be described below with reference to the accompanying drawings as follows.

Figure 3:
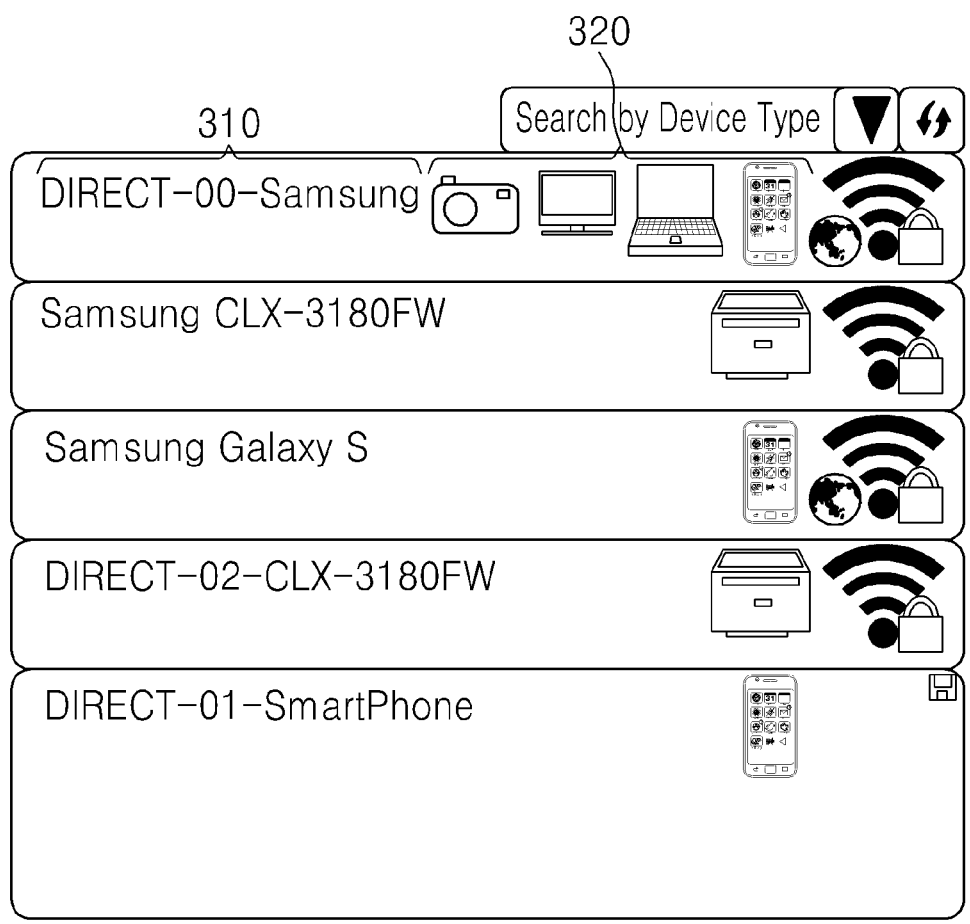
FIG. 3 is a diagram illustrating an example of displaying a list of Wi-Fi Direct devices that are found after a device discovery process performed by a device supporting the Wi-Fi Direct, according to an exemplary embodiment of the present general inventive concept.

FIG. 3 is a diagram illustrating an example of displaying a list of the Wi-Fi Direct devices that are searched during the device discovery process performed by the Wi-Fi Direct device, according to an exemplary embodiment of the present general inventive concept. When the device discovery process is performed by the Wi-Fi direct device, device information 310, such as a type of the device and a service set identifier (SSID) of the device, is exchanged between the devices through a probe request and a probe response that are WLAN packets, and the Wi-Fi direct device that performs the device discovery process displays the collected information. As illustrated in FIG. 3, the SSIDs and the types of the searched Wi-Fi Direct devices are represented as text or icons as device icons 320. Here, all of the searched devices may be represented in the list. However, the devices may be filtered so that the devices of only a particular type may be displayed in the list. According to the Wi-Fi Direct technology, the Wi-Fi direct devices are defined in category units. The Wi-Fi Direct devices may be classified as categories, for example, computers, input devices, printers, scanners, facsimiles, copying machines, and cameras, but are not limited thereto, and each of the categories may be divided into sub-categories. For example, the computer may be classified as personal computers (PCs), servers, laptop computers, etc., but is not limited thereto.

Figure 4:
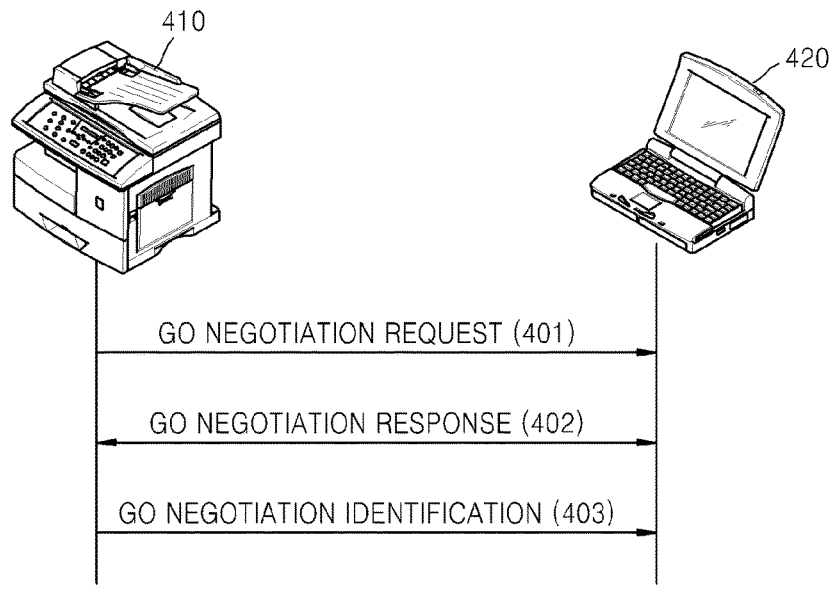
FIG. 4 is a diagram illustrating a group formation process in the processes of connecting the Wi-Fi Direct supporting devices to each other, according to an exemplary embodiment of the present general inventive concept.

FIG. 4 is a diagram illustrating the group formation process in detail among the connecting processes between the Wi-Fi Direct devices, according to an exemplary embodiment of the present general inventive concept. The group formation process is a process of determining which of the Wi-Fi Direct devices are to form a network, which one of the Wi-Fi Direct devices is to be the GO, and which of the remaining Wi-Fi Direct devices are to be the clients. For example, when the Wi-Fi direct MFP 410 performs the device discovery and selects a laptop computer 420 from among the discovered Wi-Fi Direct devices to be connected, the MFP 410 transmits a GO negotiation request to the laptop computer 420 (401). The laptop computer 420 receiving the GO negotiation request compares an intent value thereof with an intent value of the MFP 410, and then, determines the MFP 410 to be the GO when the intent value of the MFP 410 is greater than that of the laptop computer 420. Likewise, the laptop computer 420 is determined to be the GO when the intent value of the laptop computer 420 is greater than the intent value of the MFP 410. The intent value may include a value representing a degree of task intent in each device, and may be determined by manufacturer policy, user settings, etc., but is not limited thereto. The intent value of the device, which is supplied power always, may be set to be relatively high. As described above, after determining the Wi-Fi Direct device to be the GO by comparing the intent values, the laptop computer 420 transmits the determination result to the MFP 410 as a response to the GO negotiation (402). The MFP 410, which receives the determination result from the laptop computer 420, transmits an acknowledgement to the laptop computer 420 (403) in order to verify the receipt of the negotiation, and then, the group formation process is finished. When the group formation is completed, the Wi-Fi Direct device that is determined to be the GO manages security information and SSIDs of the other Wi-Fi Direct devices included in the group.

When the group is formed, the Wi-Fi Direct devices included in the group are securely connected to each other through the WPS. FIG. 5 is a diagram illustrating a display screen 500 to execute the WPS, according to an exemplary embodiment of the present general inventive concept. The display screen of FIG. 5 may be displayed on a display unit of the Wi-Fi Direct MFP. Referring to FIG. 5, the user may select one of a WPS button 510 and a PIN code 520 to execute the WPS. When the WPS is executed through the WPS button 510, the WPS button 510 of the Wi-Fi Direct MFP is pushed and WPS buttons of other devices are pushed within a predetermined period of time, and then, security information is exchanged between the devices automatically and the secure connection is completed. Here, the Wi-Fi Direct device that is the GO provides security information to the Wi-Fi direct devices that are the clients. In addition, the secure connection is performed after encrypting in the WPA2-PSK verification method, and thus, high security may be achieved.

Figure 6:
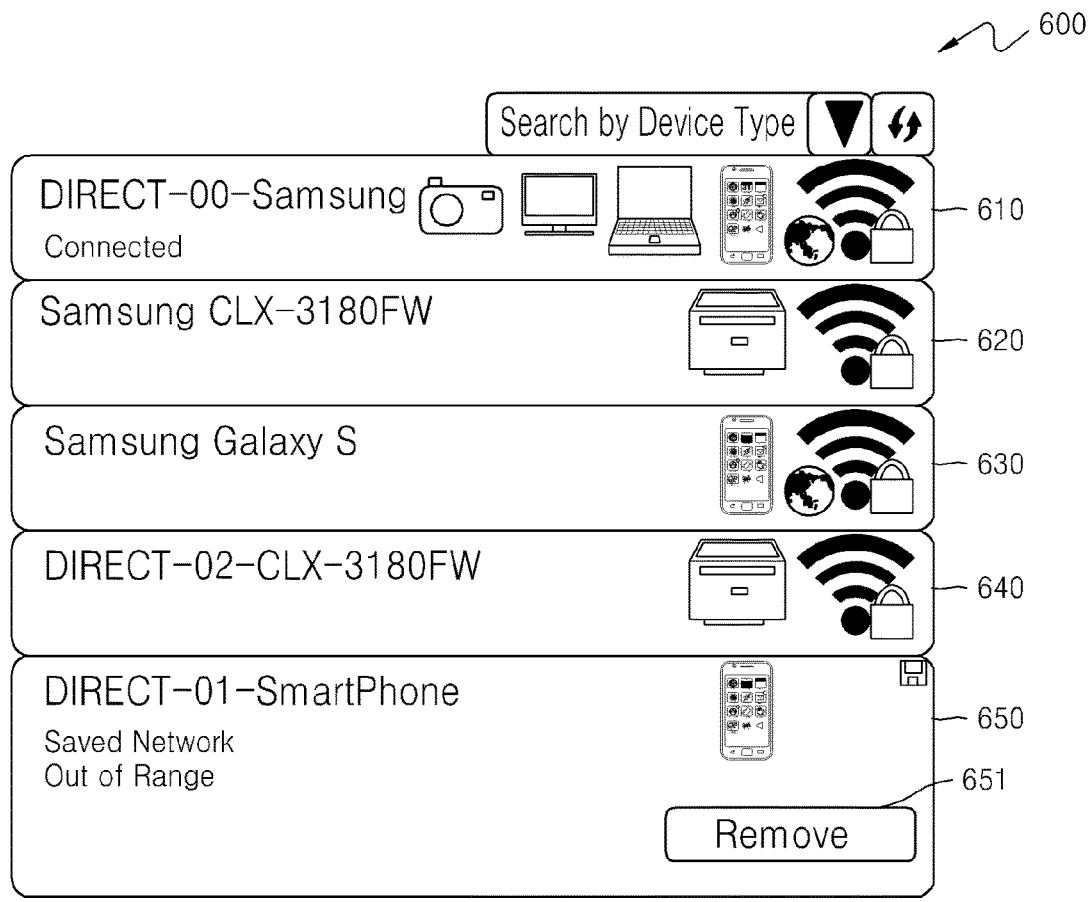
FIG. 6 is a diagram illustrating a list of devices supporting Wi-Fi Direct, information of which is stored according to a profile storing function, according to an exemplary embodiment of the present general inventive concept.

The Wi-Fi Direct devices each have a profile storage function to store information of the Wi-Fi Direct devices that have been previously connected thereto. FIG. 6 is a diagram illustrating a display screen 600 including a list of the Wi-Fi Direct devices, information of which is stored according to the profile storage function, according to an exemplary embodiment of the present general inventive concept. The list of FIG. 6 is a screen displayed on the display unit of the Wi-Fi Direct MFP. Information of a first list 610 denotes a Wi-Fi Direct device currently connected to the Wi-Fi Direct MFP, information of second through fourth lists 620-640 include Wi-Fi Direct devices that are not currently connected to the Wi-Fi Direct MFP, but are included in a device discovery range of the Wi-Fi Direct MFP, and information of a fifth list 650 denotes a Wi-Fi Direct device that has been previously connected to the Wi-Fi Direct device, although it is not discovered currently. If the information of the fifth list 650 is not necessary, the user may delete the fifth list 650 by pushing (e.g., clicking on) a remove button 651. Since the Wi-Fi direct device has the profile storage function as described above, the Wi-Fi Direct device stores information of the other Wi-Fi Direct devices previously connected thereto, and then, may be connected quickly without executing the WPS by using the stored information if the same device tries to connect thereto again.

Figure 7:
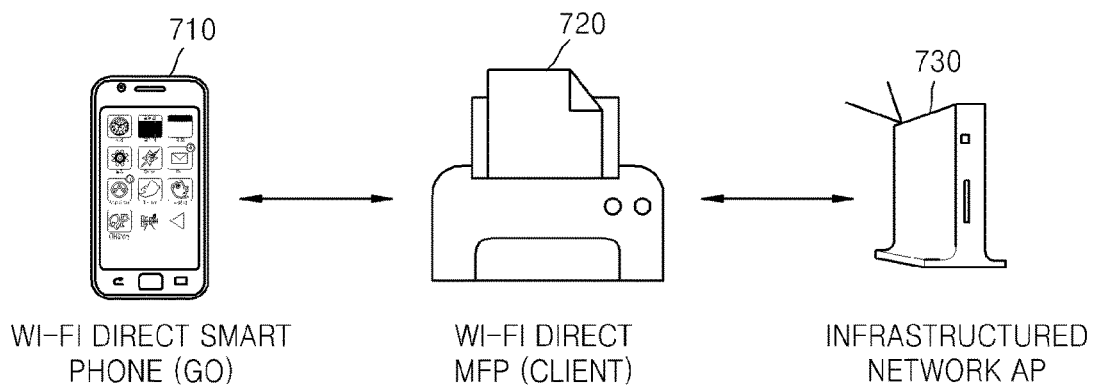
FIG. 7 is a diagram illustrating Wi-Fi Direct supporting devices that are simultaneously connected to each other, according to an exemplary embodiment of the present general inventive concept.

The Wi-Fi Direct device may be P2P connected to another Wi-Fi direct device, and at the same time, may be connected to the infrastructured network, which is referred to as a concurrent connection. FIG. 7 is a diagram illustrating the Wi-Fi Direct devices that are in the concurrent connection states, according to an exemplary embodiment of the present general inventive concept. Referring to FIG. 7, the Wi-Fi direct MFP 720 is P2P connected to a smartphone 710 that is another Wi-Fi direct device, and at the same time, the Wi-Fi Direct MFP 720 is also connected to an AP 730 of the infrastructured network. The Wi-Fi Direct MFP 720 may directly transmit and/or receive print data to and/or from the smartphone 710, and at the same time, may directly transmit and/or receive print data to and/or from the infrastructured network through the AP 730 of the infrastructured network.

When the Wi-Fi direct device is concurrently connected to the Wi-Fi Direct device and the infrastructured network as illustrated in FIG. 7, or when the Wi-Fi Direct device is wired connected to the infrastructured network and P2P connected to another Wi-Fi direct device, different IP addresses and MAC addresses with respect to the different types of connections, that is, the connection to the infrastructured network and the connection to the another Wi-Fi Direct device, may be used. Through a multi-homing technology, the Wi-Fi Direct device may provide the devices with different services from each other. For example, the Wi-Fi Direct MFP may provide services of all functions of the MFP through an interface connected to the infrastructured network, and the Wi-Fi Direct MFP may also provide services of partial functions of the MFP through an interface connected to another Wi-Fi Direct device.

Figure 8:
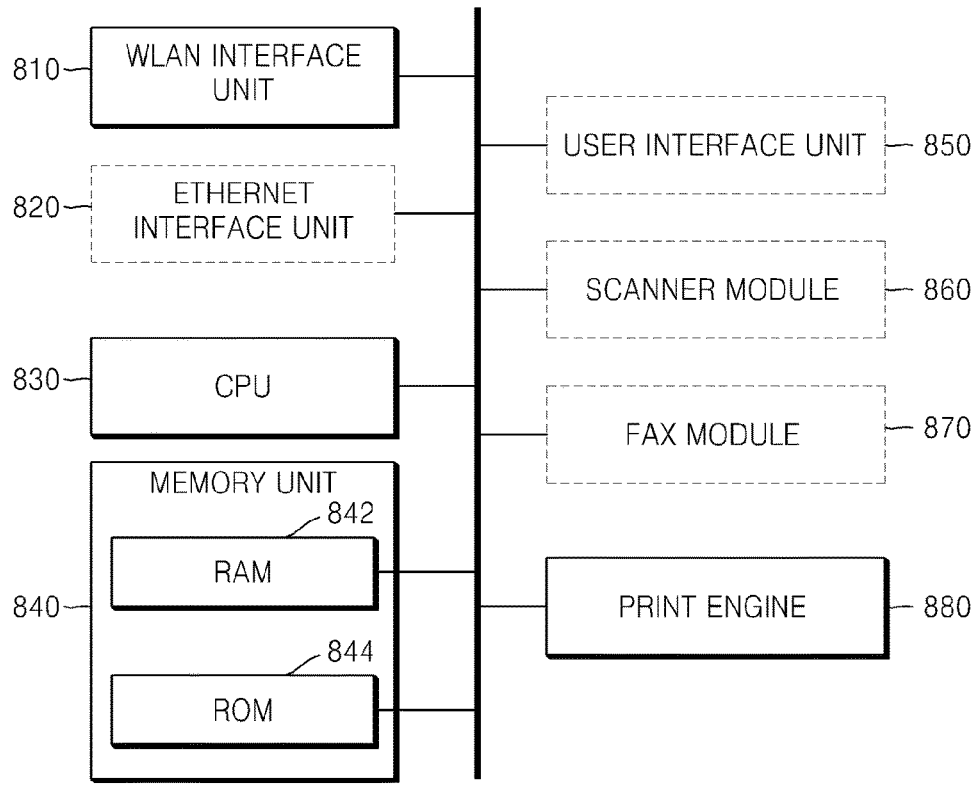
FIG. 8 is a block diagram illustrating a basic hardware configuration of a multi-function printer (MFP) supporting Wi-Fi Direct, according to an exemplary embodiment of the present general inventive concept.

FIG. 8 is a block diagram illustrating a basic hardware configuration of a Wi-Fi Direct MFP, according to an exemplary embodiment of the present general inventive concept. Referring to FIG. 8, the Wi-Fi Direct MFP may include a WLAN interface unit 810, an Ethernet interface unit 820, a central processing unit (CPU) 830, a memory unit 840, a user interface unit 850, a scanner module 860, a fax module 870, and a print engine 880. In addition, the memory unit 840 may include a random access memory (RAM) 842 and a read only memory (ROM) 844. If the MFP only supports the WLAN, the MFP may not include the Ethernet interface unit 820. In addition, if the device is a printer, rather than the MFP, the scanner module 860 and the fax module 870 are not necessary.

The WLAN interface unit 810 is hardware to perform an IEEE 802.11 b/g/n function, and may communicate with a main board, on which the CPU 830 is mounted, of the MFP via a universal serial bus (USB). The Ethernet interface unit 820 is hardware to perform wired Ethernet communication according to IEEE 802.3. The CPU 830 controls overall operations of the MFP The memory unit 840 stores information that controls the MFP and the print data that is to be read. The user interface unit 850 functions as a medium to allow the user to identify information of the MFP and to input commands into the MFP. The user interface unit 850 may be variously modified according to products, for example, may be configured as two or four lines displayed on a display unit such as an LCD or a light emitting diode (LED), or may be a graphic user interface (GUI) so as to represent various graphics. The scanner module 860, the fax module 870, and the print engine 880 are hardware to perform functions of a scanner, a facsimile, and a printer.

Figure 9:
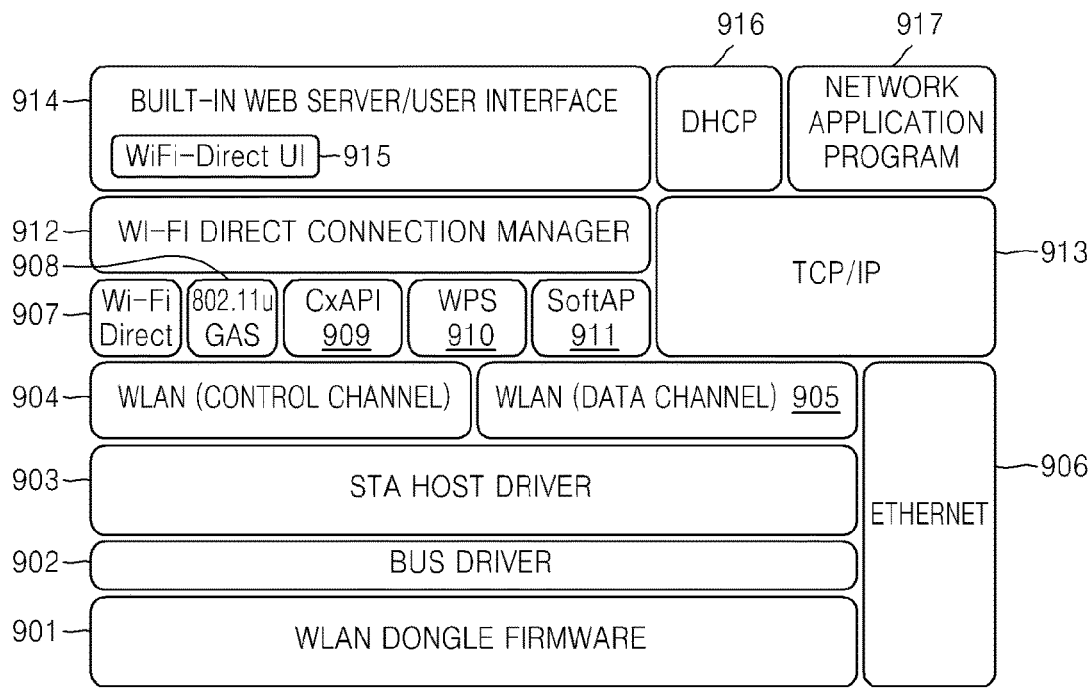
FIG. 9 is a block diagram illustrating a basic software configuration of an MFP supporting Wi-Fi Direct, according to an exemplary embodiment of the present general inventive concept.

FIG. 9 is a block diagram illustrating a basic software configuration of a Wi-Fi Direct MFP, according to an exemplary embodiment of the present general inventive concept. The software configuration of the Wi-Fi Direct MFP is as described below.

A WLAN dongle firmware 901 is a firmware to connect the WLAN, and may be stored in WLAN dongle hardware or may be transmitted to the WLAN dongle hardware from a main board of the MFP when booting the MFP. A bus driver 902 and a station (STA) host driver 903 are low level bus drivers to communicate with the WLAN hardware. A WLAN control channel 904 and a WLAN data channel 905 are channels to communicate with the WLAN firmware. Ethernet 906 is a networking standard to perform communication of data. A Wi-Fi Direct module 907 performs the Wi-Fi Direct connection and transmits an operating command to the WLAN firmware. An IEEE 802.11u generic advertisement service (GAS) module 908 performs functions according to IEEE 802.11u GAS, a CxAPI 909 is an application program interface to perform digital transmission of voice, video, data, and other network services over the traditional circuits of the public switched telephone network, and a WPS module 910 performs a WPS function. A soft AP module 911 is a software module allowing the MFP to perform as the AP. A transmission control protocol (TCP)/IP 913 is a standard protocol to perform network transmission. A Wi-Fi Direct connection manager 912 is a module to control the Wi-Fi Direct connection. A Wi-Fi Direct user interface 915 allows the user to perform settings related to the Wi-Fi Direct, and may be included in a user interface 914 that is installed in an embedded web server (EWS). A dynamic host configuration protocol (DHCP) server 916 automatically allocates an IP to the Wi-Fi Direct device that is connected as a client. A network application program 917 performs various application operations relating to the network.

The above-described Wi-Fi Direct technology has the following features and utilities.

The Wi-Fi Direct device may be connected to other devices whenever and wherever a user desires, and thus, has maximum mobility and portability. If a new Wi-Fi Direct device is added, the Wi-Fi Direct device may be directly connected to the new Wi-Fi direct device. In addition, it may be identified whether there is an available device or service before setting the connection to other devices, and thus, the Wi-Fi direct devices may be conveniently used. In addition, the connection may be performed simply and stably by a simple operation, for example, by pushing a WPS button, and the connection may be performed with high security functions by using the WPA2 technology.

In addition, the Wi-Fi Direct technology may provide various functions that may not be provided by the conventional WLAN technology.

For example, the Wi-Fi Direct technology may provide the device discovery function to search to find peripheral Wi-Fi Direct devices by the device type unit, the service discovery function that may search to find services provided by the peripheral Wi-Fi Direct devices, a power management function that may effectively and efficiently use electric power, the concurrent connection function that may form the P2P connection between the Wi-Fi Direct devices while connecting to the conventional infrastructured network, a function of separating a security domain between the infrastructured network connection and the Wi-Fi Direct connection, and a cross connection function to share an Internet connection.

In addition, since the Wi-Fi Direct technology is based on the conventional WLAN technology, that is, IEEE 802.11, the Wi-Fi Direct devices may be compatible with conventional legacy WLAN devices.

A method of activating Wi-Fi Direct, a method of performing an image forming operation, a method of managing channels, and a method of switching WLAN modes, in a Wi-Fi Direct MFP, will now be described in detail with reference to the accompanying drawings.

As described above with reference to FIG. 7, a Wi-Fi Direct MFP supports a concurrent connection function for allowing P2P connection to another Wi-Fi Direct device and infrastructured network connection at the same time. The concurrent connection function is very useful in a current general office environment where a wireless MFP is connected to an AP of an infrastructured network and a print operation also needs to be performed by using other wireless devices not connected to the AP. Although a wireless device not connected to an AP is connected to an MFP by using an ad-hoc function so as to use a wireless print service in a conventional case, one MFP may not be connected to an infrastructured network and use an ad-hoc function at the same time.

When an MFP uses a concurrent connection function, a method of performing an image forming operation such as print or scan by using a wireless device P2P connected via Wi-Fi Direct, a method of managing a channel used to be connected to an infrastructured network and a channel used to be connected to Wi-Fi Direct, and a method of switching a Wi-Fi Direct mode and an ad-hoc mode, need to be explained in detail.

Initially, a method of activating Wi-Fi Direct to operate a Wi-Fi Direct MFP as an AGO will now be described.

Figure 10:
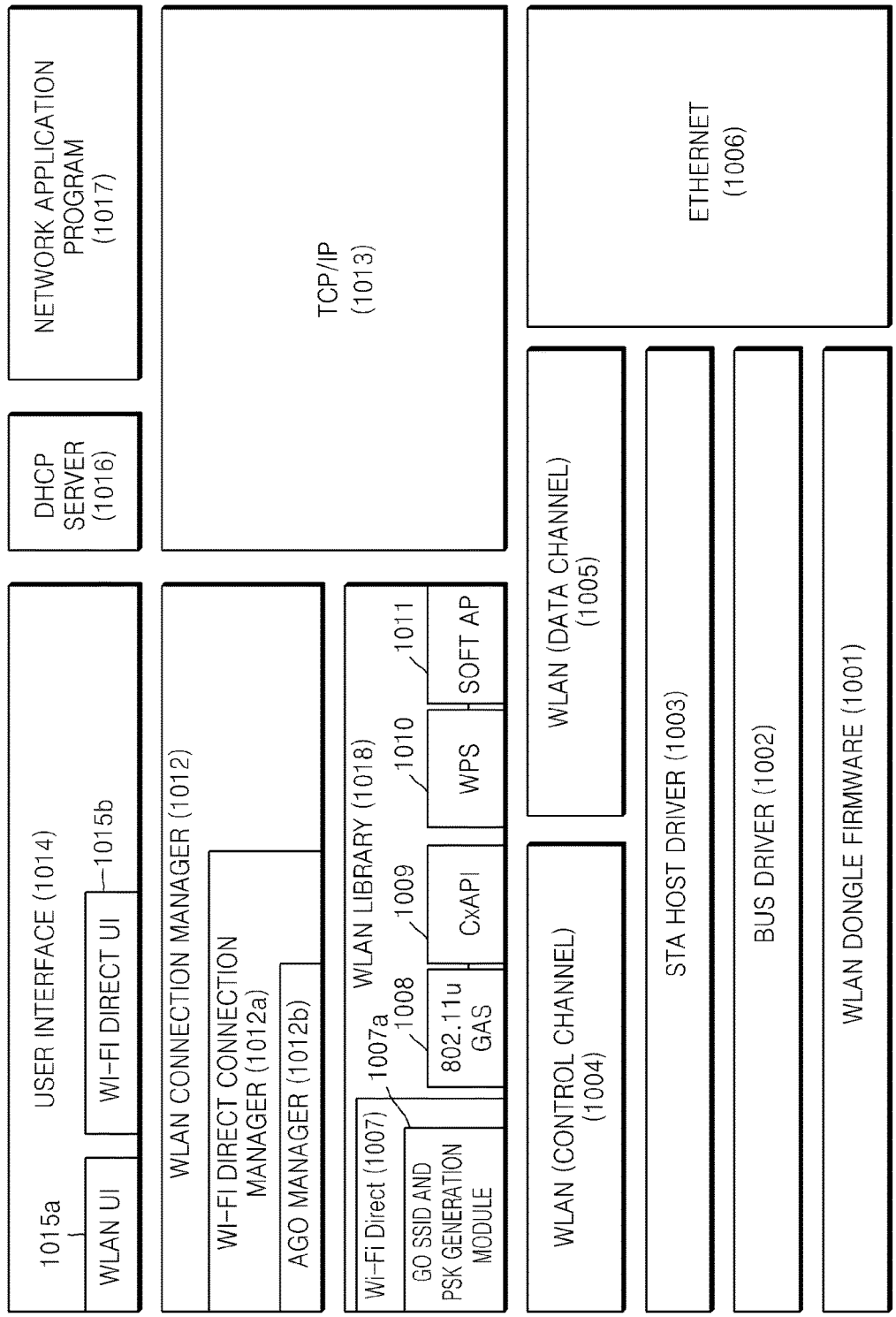
FIG. 10 is a block diagram illustrating a software configuration of an MFP supporting Wi-Fi Direct, according to an exemplary embodiment of the present general inventive concept.

FIG. 10 is a block diagram illustrating a software configuration of a Wi-Fi Direct MFP, according to an exemplary embodiment of the present general inventive concept. In the configuration of FIG. 10, distinctive features of the present embodiment are as described below.

A WLAN dongle firmware 1001 is a firmware to connect the WLAN, and may be stored in WLAN dongle hardware or may be transmitted to the WLAN dongle hardware from a main board of the MFP when booting the MFP. A bus driver 1002 and a station (STA) host driver 1003 are low level bus drivers to communicate with the WLAN hardware. A WLAN control channel 1004 and a WLAN data channel 1005 are channels to communicate with the WLAN firmware. Ethernet 1006 is a networking standard to perform communication of data. An IEEE 802.11u generic advertisement service (GAS) module 1008 performs functions according to IEEE 802.11u GAS, a CxAPI 1009 is an application program interface to perform digital transmission of voice, video, data, and other network services over the traditional circuits of the public switched telephone network, and a WPS module 1010 performs a WPS function. A soft AP module 1011 is a software module allowing the MFP to perform as the AP. A transmission control protocol (TCP)/IP 1013 is a standard protocol to perform network transmission. A WLAN user interface 1015a and a Wi-Fi Direct user interface 1015b allow the user to perform settings related to the WLAN and Wi-Fi Direct, respectively, and may be included in a user interface 1014 that is installed in an embedded web server (EWS). A dynamic host configuration protocol (DHCP) server 1016 automatically allocates an IP to the Wi-Fi Direct device that is connected as a client. A network application program 1017 performs various application operations relating to the network. An AGO manager 1012b included in a Wi-Fi Direct connection manager 1012a allows the Wi-Fi Direct MFP to operate as an AGO. Also, a GO service set identifier (SSID) and pre-shared key (PSK) generation module 1007a included in a Wi-Fi Direct module 1007 generates an SSID and a PSK required when the Wi-Fi Direct MFP operates as an AGO. The IEEE 802.11u generic advertisement service (GAS) module 1008, the CxAPI 1009, the WPS module 1010, the soft AP module 1011, and the Wi-Fi Direct library 1007 may all be provided within a WLAN library 1018.

Figure 11:
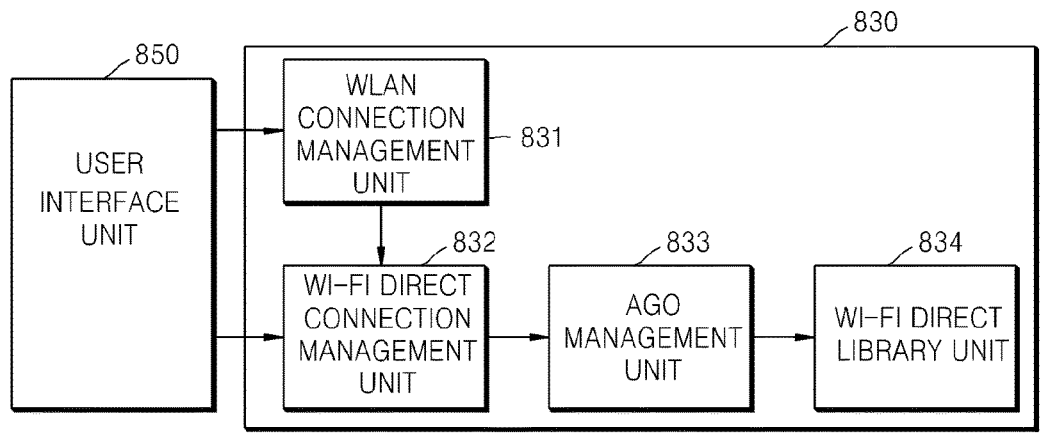
FIG. 11 is a block diagram of an MFP supporting Wi-Fi Direct, according to an exemplary embodiment of the present general inventive concept.

FIG. 11 is a block diagram of a Wi-Fi Direct MFP, according to an exemplary embodiment of the present general inventive concept. Referring to FIG. 11, the CPU 830 of FIG. 8 may include a WLAN connection management unit 831, a Wi-Fi Direct connection management unit 832, an AGO management unit 833, and a Wi-Fi Direct library unit 834. If a Wi-Fi Direct initialization command is received from a user via the user interface unit 850, or from the WLAN connection management unit 831, the Wi-Fi Direct connection management unit 832 sets a GO flag to be turned "on." The AGO management unit 833 checks the GO flag, and activates Wi-Fi Direct to operate the MFP as a GO if the GO flag is in an "on" state. The Wi-Fi Direct library unit 834 generates a SSID and a PSK of a GO according to a command of the AGO management unit 833.

Figure 12:
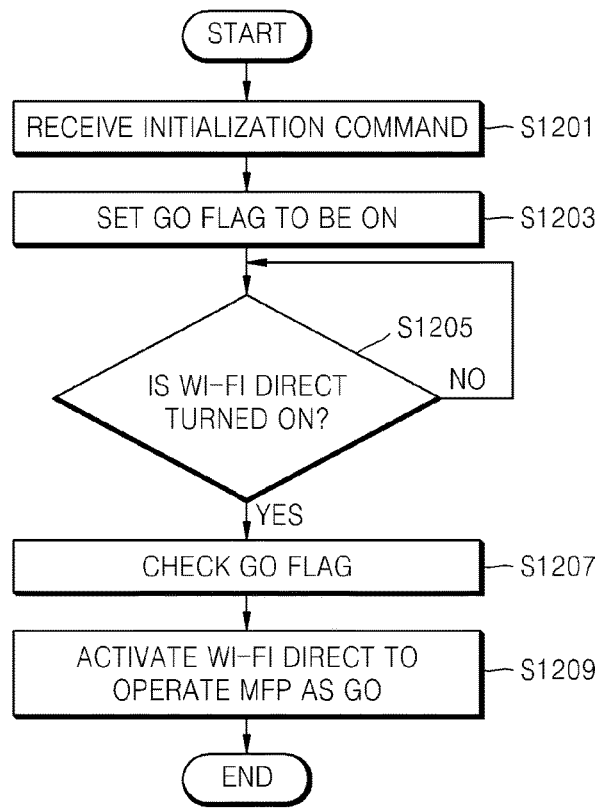
FIGS. 12, 13A, and 13B are flowcharts describing a method of activating Wi-Fi Direct in an MFP supporting Wi-Fi Direct, according to exemplary embodiments of the present general inventive concept.
Figure 13A:
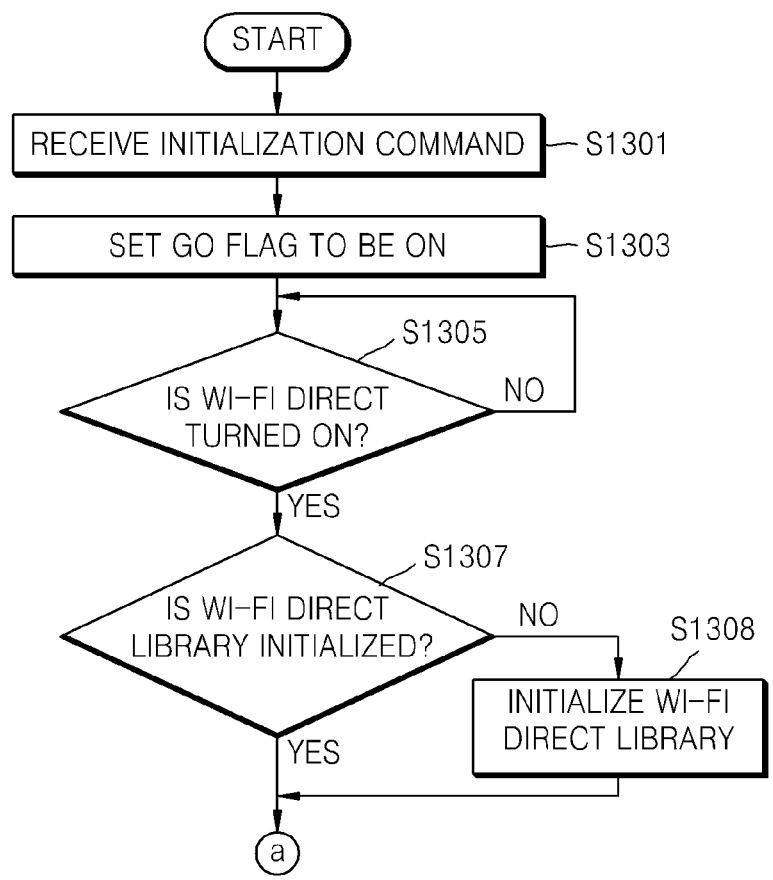
Figure 13B:
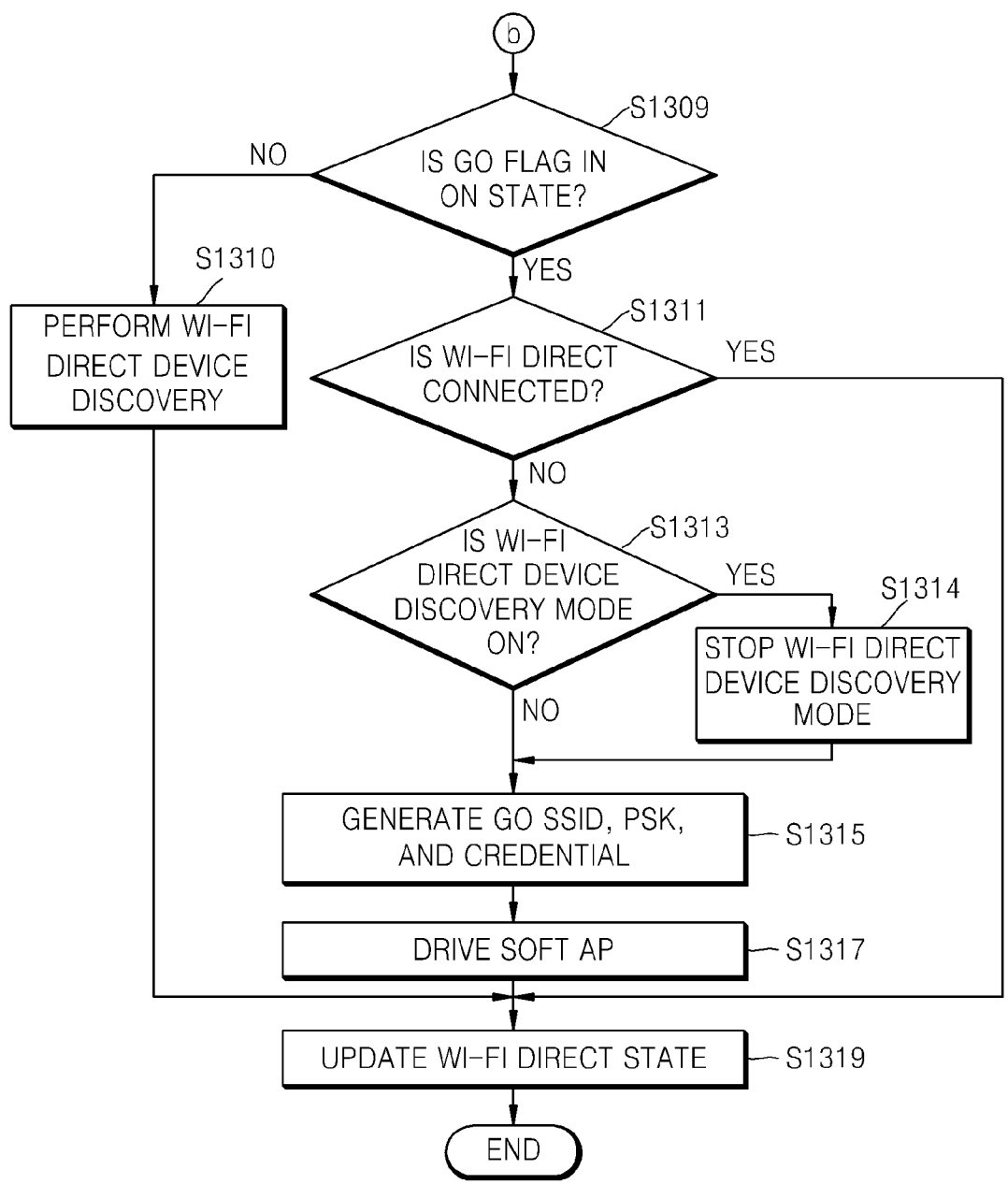

FIGS. 12, 13A, and 13B are flowcharts illustrating a method of activating Wi-Fi Direct in a Wi-Fi Direct MFP, according to exemplary embodiments of the present general inventive concept. The method of activating the Wi-Fi Direct will now be described in detail with reference to FIGS. 11 through 13B.

Referring to FIG. 12, an initialization command is received in operation S1201. As such, the initialization command refers to a Wi-Fi Direct initialization command and includes an MFP initialization command that causes initialization of Wi-Fi Direct. The initialization command may be input directly from a user via the user interface unit 850, or may be transmitted from the WLAN connection management unit 831. If the initialization command is received, the Wi-Fi Direct connection management unit 832 sets a GO flag to be turned "on" in operation S1203. The GO flag is an indicator to indicate whether to activate the Wi-Fi Direct to operate the MFP as a GO, and is set to be turned "on" to allow the MFP to operate as a GO or is set to be turned "off" to allow the MFP not to operate as a GO. In the current embodiment, by automatically setting the GO flag to be in an "on" state if the initialization command is received, the MFP may operate as an AGO without being connected to another Wi-Fi Direct device. Then, it is determined in operation S1205 whether the Wi-Fi Direct is turned "on." If the Wi-Fi Direct is turned "on," the method proceeds to operation S1207 and the AGO management unit 833 checks the GO flag and, if the GO flag in an "on" state, the method proceeds to operation S1209 to activate the Wi-Fi Direct to operate the MFP as a GO. Furthermore, when it is determined in operation S1205 whether the Wi-Fi Direct is turned "on," the turned on state of the Wi-Fi Direct refers to a state in which the MFP is set to use a Wi-Fi Direct function.

Referring to FIG. 13A, if an initialization command is received in operation S1301, a GO flag is set to be turned "on" in operation S1303, and it is determined in operation S1305 whether Wi-Fi Direct is turned "on." The above operations are the same as those illustrated in FIG. 12. If it is determined that the Wi-Fi Direct is turned "on" in operation S1305, the Wi-Fi Direct connection management unit 832 determines in operation 1307 whether a Wi-Fi Direct library is initialized. If it is determined that the Wi-Fi Direct library is initialized, the method proceeds to operation S1309, as illustrated in FIG. 13B, and the AGO management unit 833 determines whether a GO flag is in an "on" state. If it is determined that the Wi-Fi Direct library is not initialized, the Wi-Fi Direct library is initialized in S1308 and the method proceeds to operation S1309, as illustrated in FIG. 13B. Referring to FIG. 13B, if it is determined in operation S1309 that the GO flag is in an "on" state, the method proceeds to operation S1311 to determine whether the Wi-Fi Direct is connected. If it is determined in operation S1309 that the GO flag is in an "off" state, Wi-Fi Direct device discovery is performed in operation S1310 and the method proceeds to operation S1319 to update a Wi-Fi Direct state. If it is determined in operation S1311 that the Wi-Fi Direct is connected, the method also proceeds to operation S1319 to update the Wi-Fi Direct state. In contrast, if it is determined in operation S1311 that the Wi-Fi Direct is not connected, the method proceeds to operation S1313 to determine whether a Wi-Fi Direct device discovery mode is turned "on." If the Wi-Fi Direct device discovery mode is not turned "on," the method proceeds to operation S1315. However, if the Wi-Fi Direct device discovery mode is turned "on," the Wi-Fi Direct device discovery mode is stopped in operation S1314 and the method proceeds to operation S1315. If an SSID, a PSK, and a GO credential to operate the MFP as a GO are generated in operation S1315, the Wi-Fi Direct is activated to drive a soft AP and to operate the MFP as a GO in operation S1317, and the Wi-Fi Direct state is updated in operation S1319.

As described above, by allowing an MFP is allowed to operate as an AGO if Wi-Fi Direct is activated according to a Wi-Fi Direct initialization command, since a Wi-Fi Direct network may be formed even when another Wi-Fi Direct device is not connected, connection to legacy wireless devices not supporting the Wi-Fi Direct may be provided and the MFP, as a fixed device, may function as a GO that requires a relatively large amount of power consumption. Also, an IP address of the MFP may be fixed.

Figure 14:
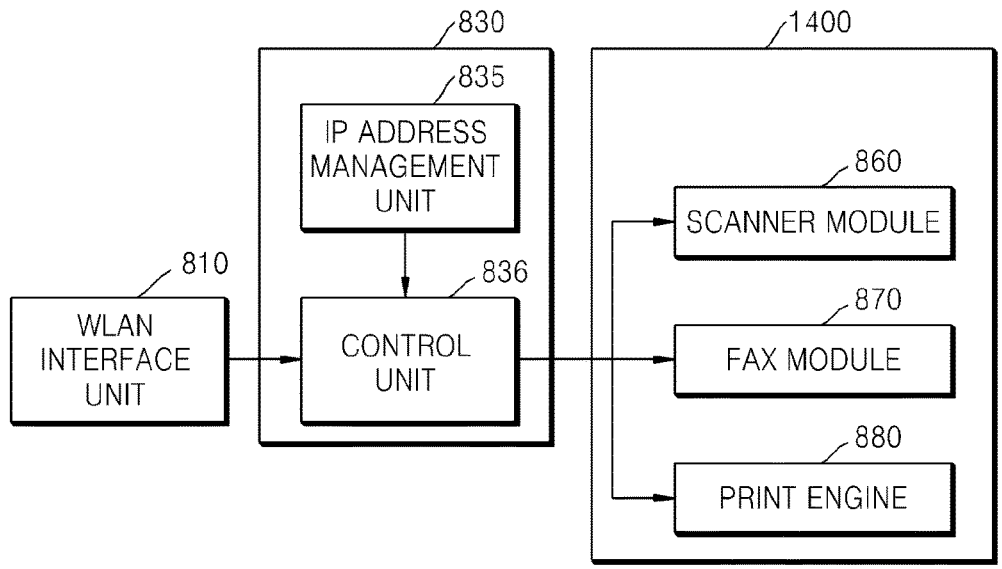
FIG. 14 is a block diagram of an MFP supporting Wi-Fi Direct, according to another exemplary embodiment of the present general inventive concept.

A method of performing an image forming operation in a Wi-Fi Direct MFP will now be described in detail with reference to the accompanying drawings. FIG. 14 is a block diagram of a Wi-Fi Direct MFP, according to another exemplary embodiment of the present general inventive concept. Referring to FIG. 14, the CPU 830 of FIG. 8 may include an IP address management unit 835 and a control unit 836. The scanner module 860, the fax module 870, and the print engine 880 are included in an image forming operation performing unit 1400.

The WLAN interface unit 810 allows the MFP to achieve infrastructure network connection and Wi-Fi Direct connection at the same time. The IP address management unit 835 manages an IP address of an infrastructure network interface and an IP address of a Wi-Fi Direct interface. Since the MFP supports a concurrent connection function as described above, if infrastructure network connection and Wi-Fi Direct connection are achieved at the same time according to the concurrent connection function, the MFP has different IP addresses according to the respective interfaces. The IP address management unit 835 checks and provides the IP address of each interface to the control unit 836. The control unit 836 receives the IP address from the IP address management unit 835 and controls an image forming operation requested by an external wireless device. In more detail, if a discovery packet is received via the Wi-Fi Direct interface from a wireless device Wi-Fi Direct connected to the MFP, the control unit 836 receives the IP address of the Wi-Fi Direct interface from the IP address management unit 835, and generates and transmits a response packet including the IP address to the wireless device. The discovery packet may be sent to any apparatuses or devices that are Wi-Fi Direct connected and are in range of the external wireless device. As such, the discovery packet alerts the in-range Wi-Fi Direct connected apparatuses or devices that the external wireless device is in range and is requesting information regarding operations that each of the apparatuses or devices can perform. The wireless device may obtain the IP address of the Wi-Fi Direct interface of the MFP by analyzing the response packet received from the MFP. Also, the control unit 836 may generate the response packet to further include information on services and/or operations providable by the MFP and, in this case, the wireless device may obtain the information on the services and/or operations providable by the MFP by analyzing the response packet.

If an image forming operation performing request having the IP address of the Wi-Fi Direct interface as a destination is received from the wireless device Wi-Fi Direct connected to the MFP, the control unit 836 may control the image forming operation performing unit 1400 to perform the requested image forming operation. For example, if print data having the IP address of the Wi-Fi Direct interface as a destination is received from the wireless device, the control unit 836 controls the print engine 880 to perform a print operation according to the received print data. Alternatively, if a scan request having the IP address of the Wi-Fi Direct interface as a destination is received from the wireless device, the control unit 836 instructs the scanner module 860 to perform a scan operation.

Figure 15:
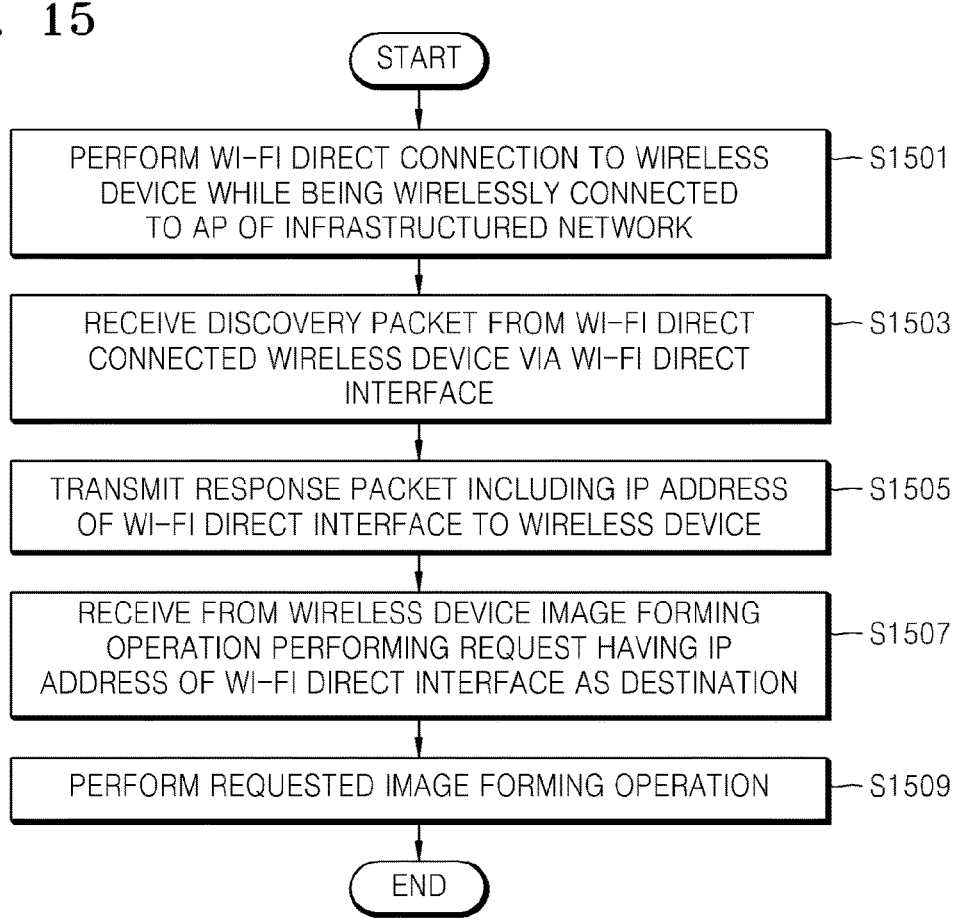
FIG. 15 is a flowchart describing a method of performing an image forming operation in an MFP supporting Wi-Fi Direct, according to an exemplary embodiment of the present general inventive concept.

FIG. 15 is a flowchart illustrating a method of performing an image forming operation in a Wi-Fi Direct MFP, according to an exemplary embodiment of the present general inventive concept. Referring to FIG. 15, Wi-Fi Direct connection to a wireless device is performed while being wirelessly connected to an AP of an infrastructured network by using a concurrent connection function, in operation S1501. The MFP receives a discovery packet from the Wi-Fi Direct connected wireless device in operation S1503. The discovery packet may be received via a Wi-Fi Direct interface. If the discovery packet is received from the wireless device via the Wi-Fi Direct interface, the MFP generates and transmits a response packet including an IP address of the Wi-Fi Direct interface to the wireless device in operation S1505. The wireless device that receives the response packet may obtain the IP address of the Wi-Fi Direct interface of the MFP by analyzing the response packet. The MFP may generate the response packet to further include information on providable services and, in this case, the wireless device may obtain the information on services providable by the MFP by analyzing the response packet. If the wireless device that receives the response packet transmits an image forming operation performing request having the IP address of the Wi-Fi Direct interface as a destination, the MFP receives the image forming operation performing request in operation S1507 and performs the requested image forming operation in operation S1509. For example, if print data having the IP address of the Wi-Fi Direct interface as a destination is received in operation S1507, the MFP performs a print operation according to the received print data in operation S1509. If a scan request having the IP address of the Wi-Fi Direct interface as a destination is received in operation S1507, the MFP performs a scan operation in operation S1509.

As described above, if a response packet including an IP address of a Wi-Fi Direct interface is transmitted to a wireless device Wi-Fi Direct connected to an MFP, and an image forming operation is performed when an image forming operation performing request having the IP address of the Wi-Fi Direct interface as a destination is received from the wireless device, the MFP may stably perform the image forming operation requested by the Wi-Fi Direct connected wireless device while infrastructured network connection and Wi-Fi Direct connection are achieved at the same time.

Figure 16:
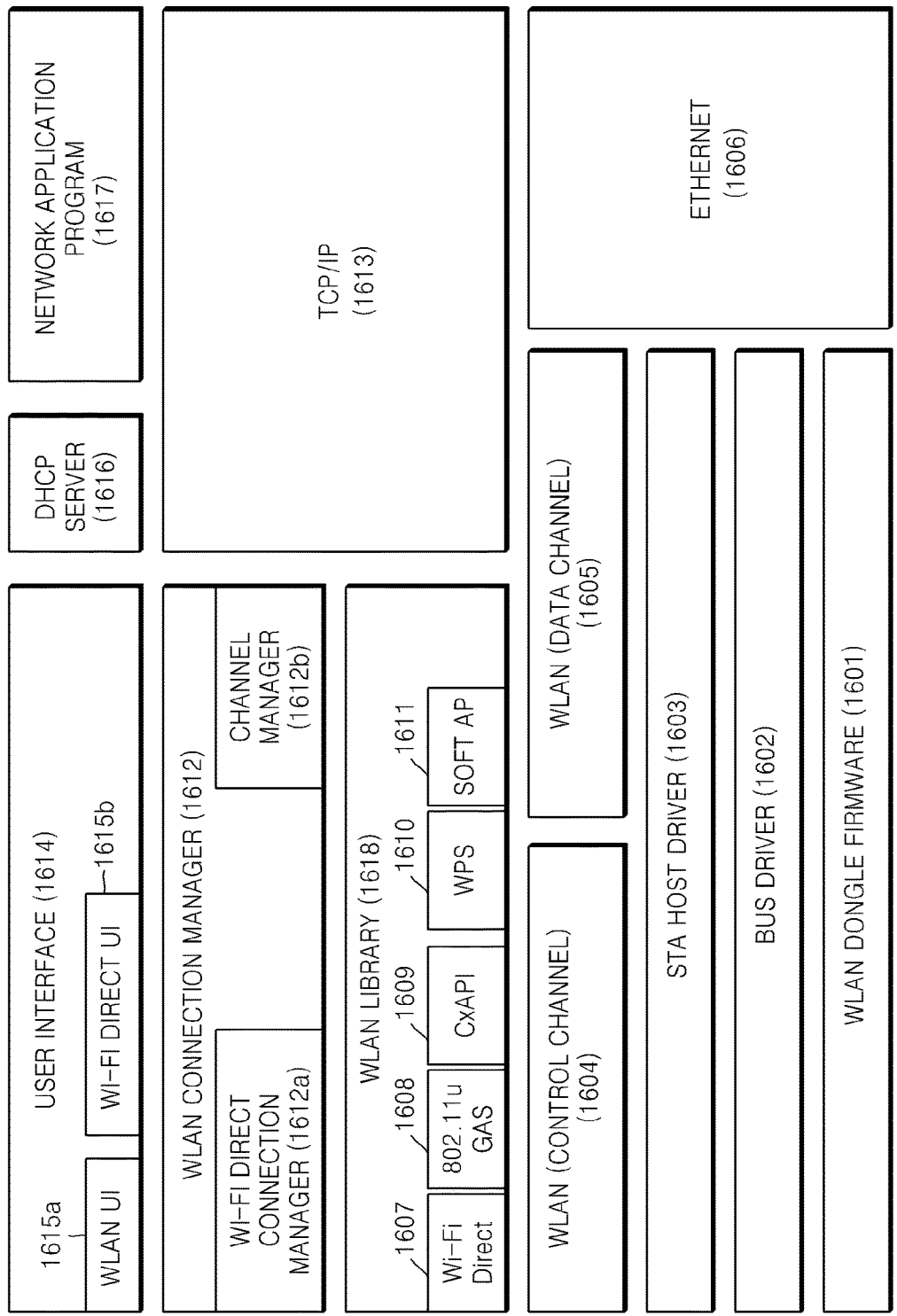
FIG. 16 is a block diagram illustrating a software configuration of an MFP supporting Wi-Fi Direct, according to an exemplary embodiment of the present general inventive concept.

A method of managing channels in a Wi-Fi Direct MFP will now be described in detail with reference to the accompanying drawings. FIG. 16 is a block diagram illustrating a software configuration of a Wi-Fi Direct MFP, according to an exemplary embodiment of the present general inventive concept. In the configuration of FIG. 16, some distinctive features of the current embodiment are as described below.

A WLAN dongle firmware 1601 is a firmware to connect the WLAN, and may be stored in WLAN dongle hardware or may be transmitted to the WLAN dongle hardware from a main board of the MFP when booting the MFP. A bus driver 1602 and a station (STA) host driver 1603 are low level bus drivers to communicate with the WLAN hardware. A WLAN control channel 1604 and a WLAN data channel 1605 are channels to communicate with the WLAN firmware. Ethernet 1606 is a networking standard to perform communication of data. A Wi-Fi Direct library 1607 performs the Wi-Fi Direct connection and transmits an operating command to the WLAN firmware. An IEEE 802.11u generic advertisement service (GAS) module 1608 performs functions according to IEEE 802.11u GAS, a CxAPI 1609 is an application program interface to perform digital transmission of voice, video, data, and other network services over the traditional circuits of the public switched telephone network, and a WPS module 1610 performs a WPS function. A soft AP module 1611 is a software module allowing the MFP to perform as the AP. A transmission control protocol (TCP)/IP 1613 is a standard protocol to perform network transmission. A WLAN user interface 1615a and a Wi-Fi Direct user interface 1615b allow the user to perform settings related to the WLAN and Wi-Fi Direct, respectively, and may be included in a user interface 1614 that is installed in an embedded web server (EWS). A dynamic host configuration protocol (DHCP) server 1616 automatically allocates an IP to the Wi-Fi Direct device that is connected as a client. A network application program 1617 performs various application operations relating to the network. A channel manager 1612b included in a WLAN connection manager 1612 manages a channel used by the MFP to be connected to an AP of an infrastructured network, and a Wi-Fi Direct connection manager 1612b, also included in the WLAN connection manager 1612, manages a Wi-Fi Direct operation channel that is used to be connected to Wi-Fi Direct. The IEEE 802.11u generic advertisement service (GAS) module 1608, the CxAPI 1609, the WPS module 1610, the soft AP module 1611, and the Wi-Fi Direct module 1607 may all be provided within a WLAN library 1618.

A method of managing the channels by the channel manager 1612b will be described below in detail with reference to FIGS. 18 through 24.

Figure 17:
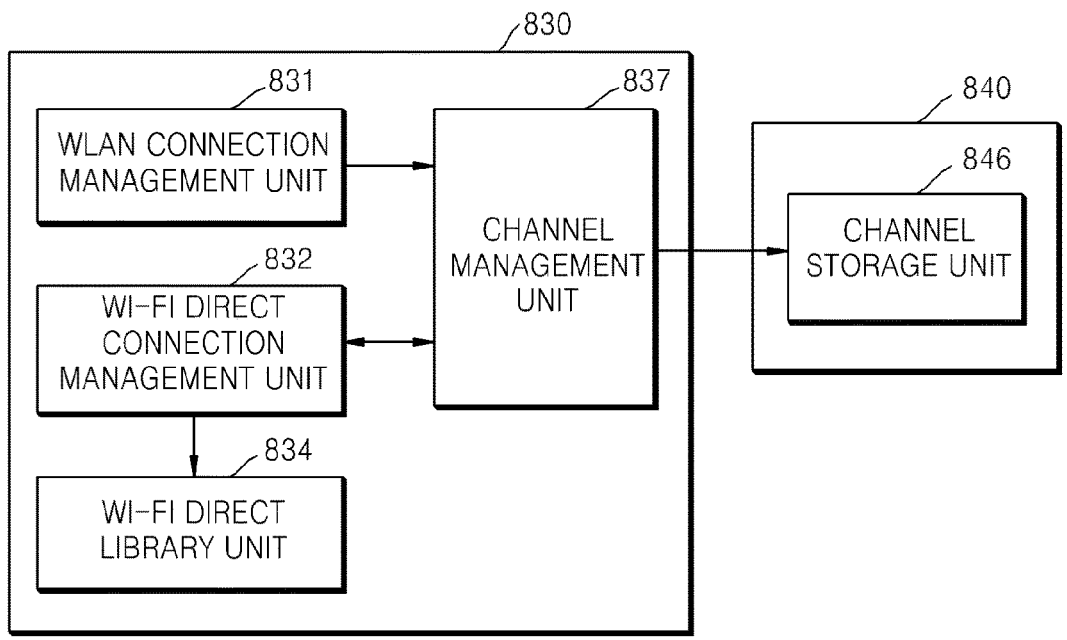
FIG. 17 is a block diagram of an MFP supporting Wi-Fi Direct, according to another exemplary embodiment of the present general inventive concept.

FIG. 17 is a block diagram of a Wi-Fi Direct MFP, according to another exemplary embodiment of the present general inventive concept. Referring to FIG. 17, the CPU 830 of FIG. 8 may include the WLAN connection management unit 831, the Wi-Fi Direct connection management unit 832, the Wi-Fi Direct library unit 834, and a channel management unit 837. Also, the memory unit 840 may include a channel storage unit 846. The channel management unit 837 receives from the WLAN connection management unit 831 information on a channel used by the MFP to be connected to an AP of an infrastructured network, and receives from the Wi-Fi Direct connection management unit 832 information on a Wi-Fi Direct operation channel used to be connected to Wi-Fi Direct. The channel management unit 837 allows the channel used to be connected to the AP and the Wi-Fi Direct operation channel to be the same. Also, the channel management unit 837 stores in the channel storage unit 846 the information on the channel used to be connected to the AP of the infrastructured network after receiving it. As such, when the connection to the AP of the infrastructured network is released and the Wi-Fi Direct is activated, the stored channel may be set as the Wi-Fi Direct operation channel. This is because, due to characteristics of the MFP being mostly used as a fixed device, the channel used once to be connected to the AP of the infrastructured network may be probably reused later. If the channel management unit 837 sets the channel used to be connected to the AP and the Wi-Fi Direct operation channel to be the same, the Wi-Fi Direct connection management unit 832 activates the Wi-Fi Direct by using the Wi-Fi Direct operation channel set by using the Wi-Fi Direct library unit 834.

FIGS. 18 through 23 are flowcharts illustrating a method of managing channels in a Wi-Fi Direct MFP, according to an exemplary embodiment of the present general inventive concept. The method of managing channels will now be described in detail with reference to FIGS. 18 through 23.

Figure 18:
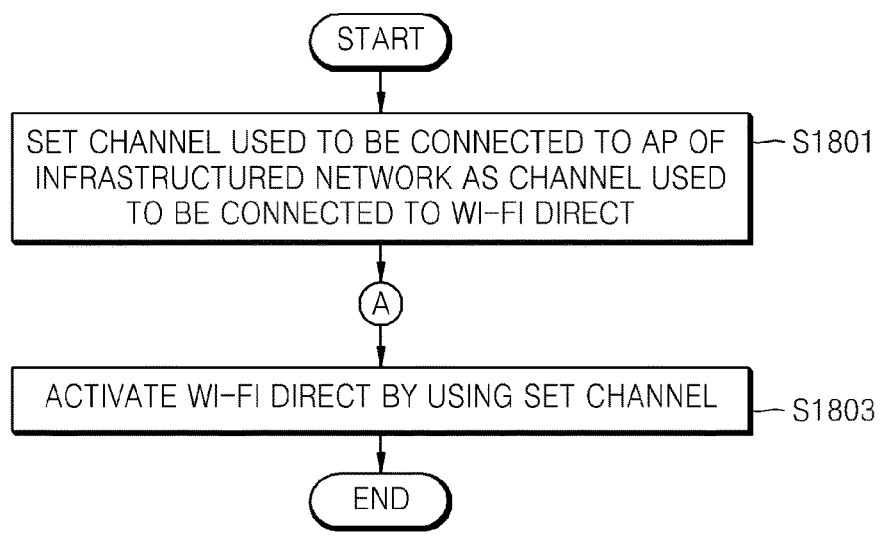
FIGS. 18 through 23 are flowcharts describing a method of managing channels in an MFP supporting Wi-Fi Direct, according to an exemplary embodiment of the present general inventive concept.
Figure 19:
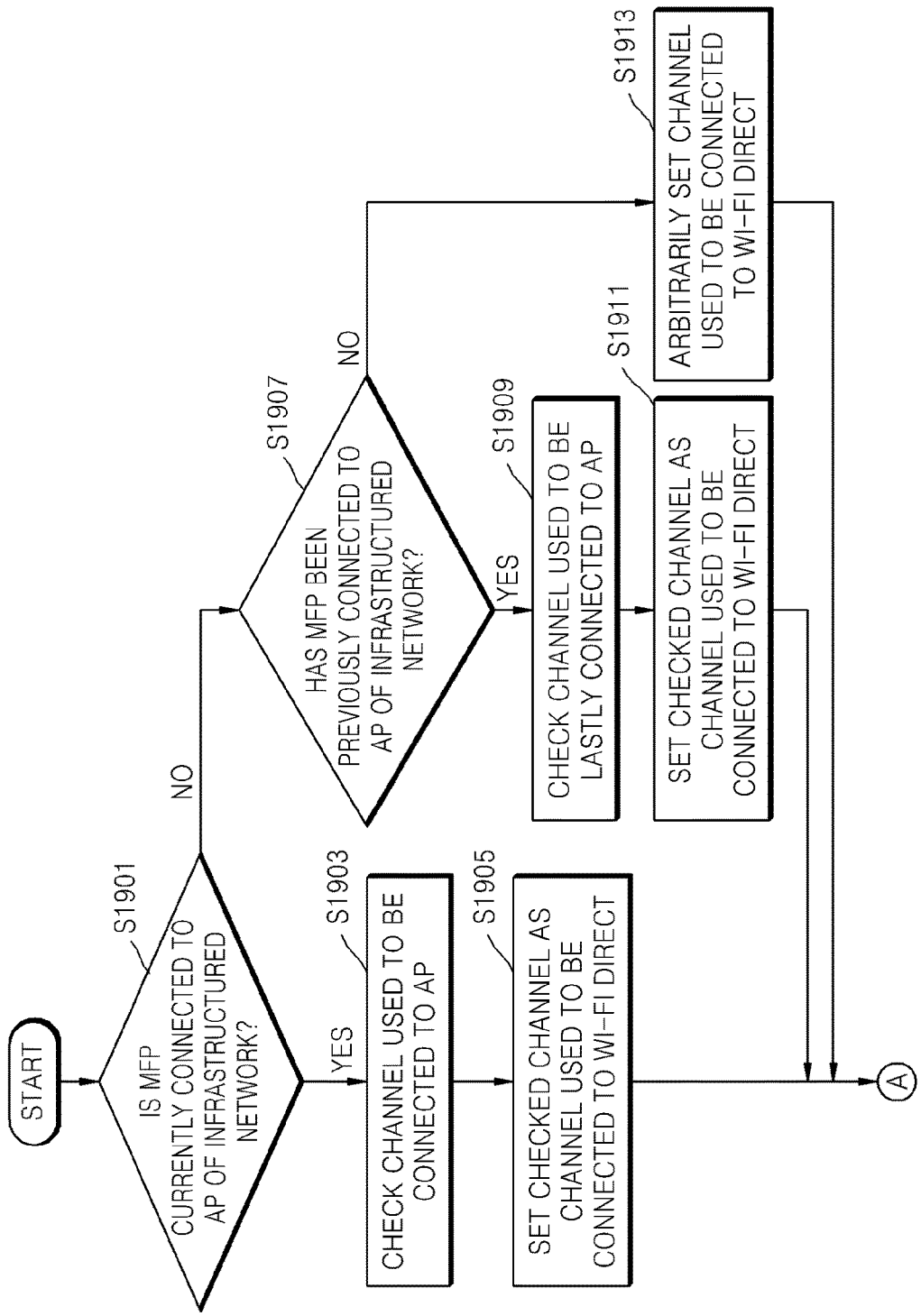

Referring to FIG. 18, a channel used by the MFP to be connected to an AP of an infrastructured network is set as a Wi-Fi Direct operation channel in operation S1801, and Wi-Fi Direct is activated by using the set channel in operation S1803. In this case, operation S1801 to set the channel that is used to be connected to the AP as the Wi-Fi Direct operation channel is illustrated in FIG. 19 in detail. Referring to FIG. 19, before activating the Wi-Fi Direct, it is determined in operation S1901 whether the MFP is currently connected to the AP of the infrastructured network. If it is determined that the MFP is currently connected to the AP of the infrastructured network, the method proceeds to operation S1903 to check a channel used to be connected to the AP. The checked channel is set as a Wi-Fi Direct operation channel in operation S1905. However, if it is determined in operation S1901 that the MFP is not currently connected to the AP of the infrastructured network, the method proceeds to operation S1907 to check whether the MFP has been previously connected to the AP of the infrastructured network. If it is determined that the MFP has been previously connected to the AP of the infrastructured network, the method proceeds to operation S1909 to check a channel used to be lastly connected to the AP, and the checked channel is set as the Wi-Fi Direct operation channel in operation S1911. However, if it is determined in operation S1907 that the MFP has not been previously connected to the AP of the infrastructured network, the method proceeds to operation S1913 to arbitrarily set the Wi-Fi Direct operation channel.

Figure 20:
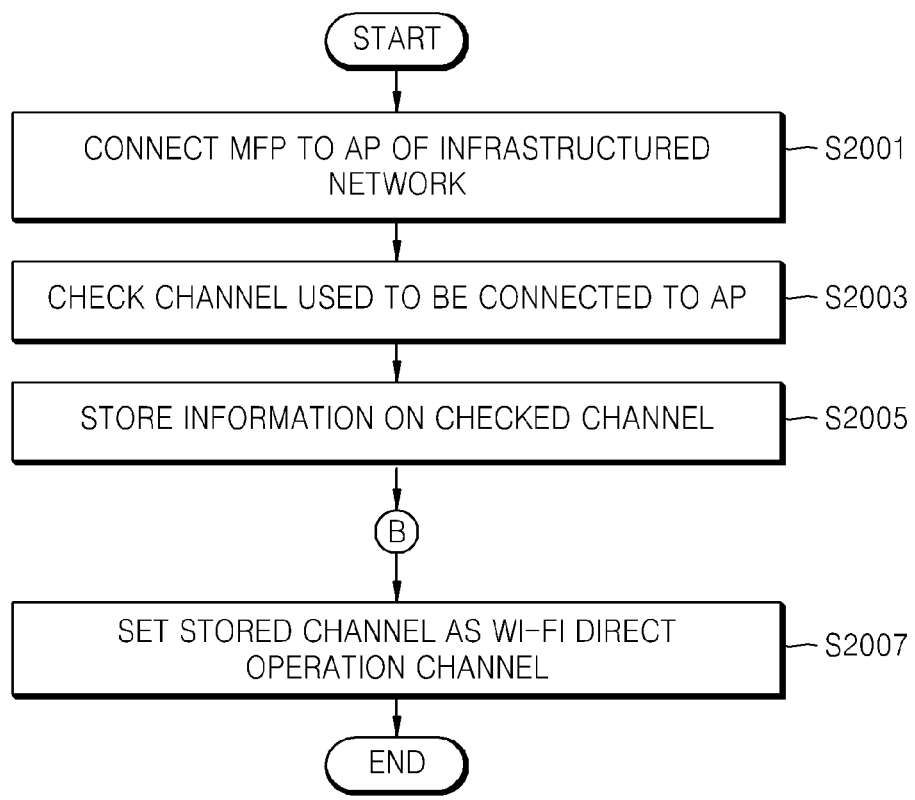
Figure 21:
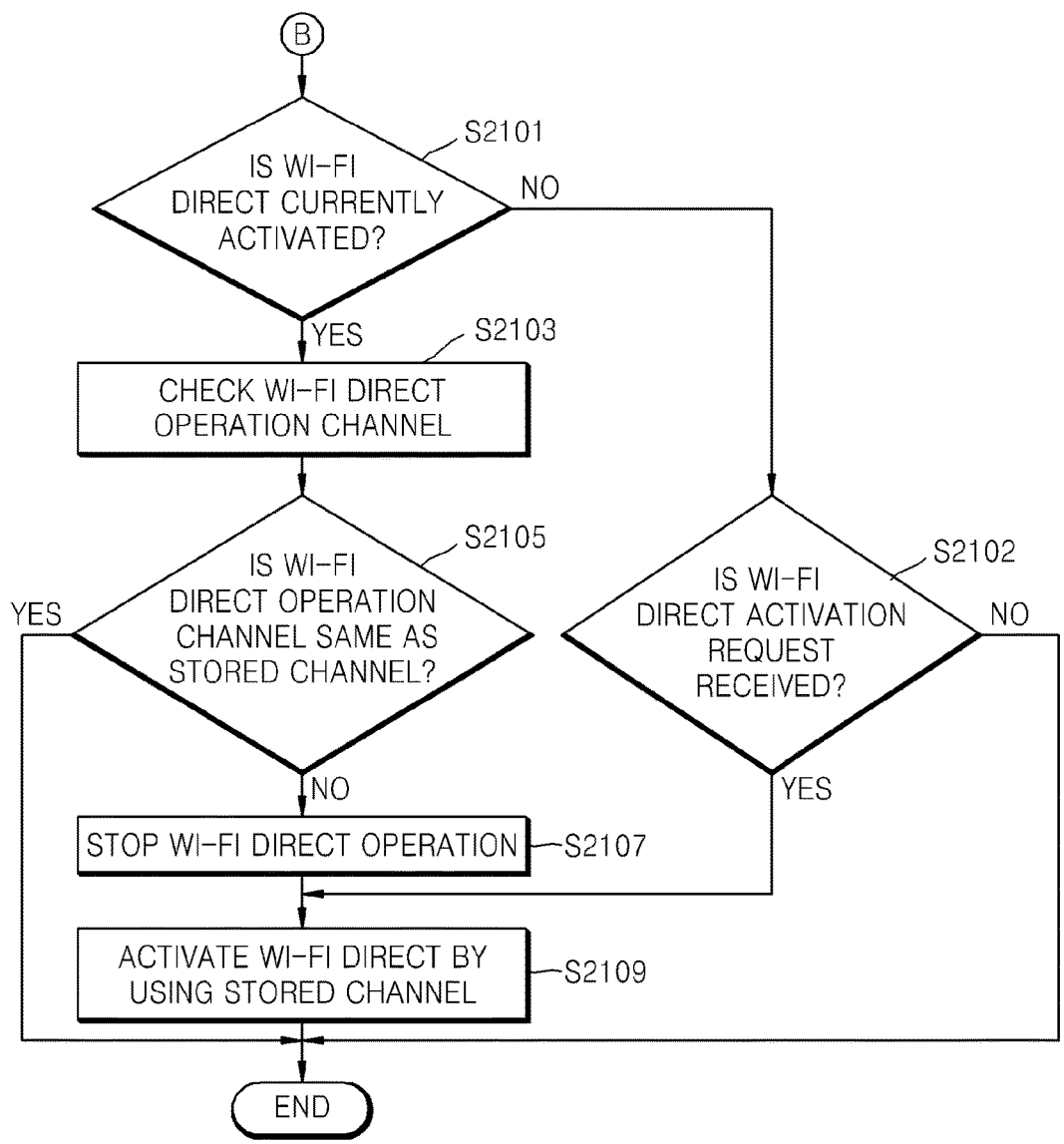
Figure 22:
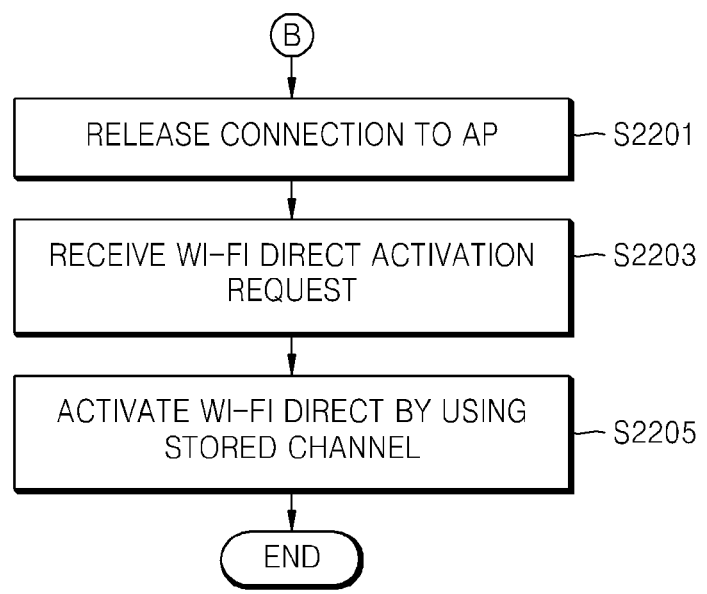

FIGS. 20 through 22 are flowcharts illustrating a method of setting the Wi-Fi Direct operation channel while the MFP is connected to the AP of the infrastructured network. Referring to FIG. 20, the MFP is connected to an AP of an infrastructured network in operation S2001, and a channel that is used to be connected to the AP is checked in operation S2003. Information on the channel checked in operation S2003 is stored in operation S2005, and then the stored channel is set as a Wi-Fi Direct operation channel in operation S2007. As such, operation S2007 to set the stored channel as the Wi-Fi Direct operation channel is illustrated in FIGS. 21 and 22 in detail. Referring to FIG. 21, after the information on the checked channel is stored in operation S2005 of FIG. 20, it is determined in operation S2101 whether Wi-Fi Direct is currently activated. If it is determined that the Wi-Fi Direct is currently activated, a Wi-Fi Direct operation channel is checked in operation S2103. Then, it is determined in operation S2105 whether the Wi-Fi Direct operation channel is the same as the stored channel. If it is determined that the Wi-Fi Direct operation channel is not the same as the stored channel, a Wi-Fi Direct operation is stopped in operation S2107 and then the stored channel is set as the Wi-Fi Direct operation channel to activate the Wi-Fi Direct in operation S2109. However, if it is determined in operation S2101 that the Wi-Fi Direct is not currently activated, it is checked in operation S2102 whether a Wi-Fi Direct activation request is received. If a Wi-Fi Direct activation request is received, the method proceeds to operation S2109 to set the stored channel as the Wi-Fi Direct operation channel and thus to activate the Wi-Fi Direct.

As another example of operation S2007, referring to FIG. 22, after the information on the checked channel is stored in operation S2005 of FIG. 20, the connection of the MFP to the AP of the infrastructured network is released in operation S2201. If the MFP receives a Wi-Fi Direct activation request in operation S2203, the method proceeds to operation S2205 to set the stored channel as the Wi-Fi Direct operation channel and thus to activate the Wi-Fi Direct.

Figure 23:
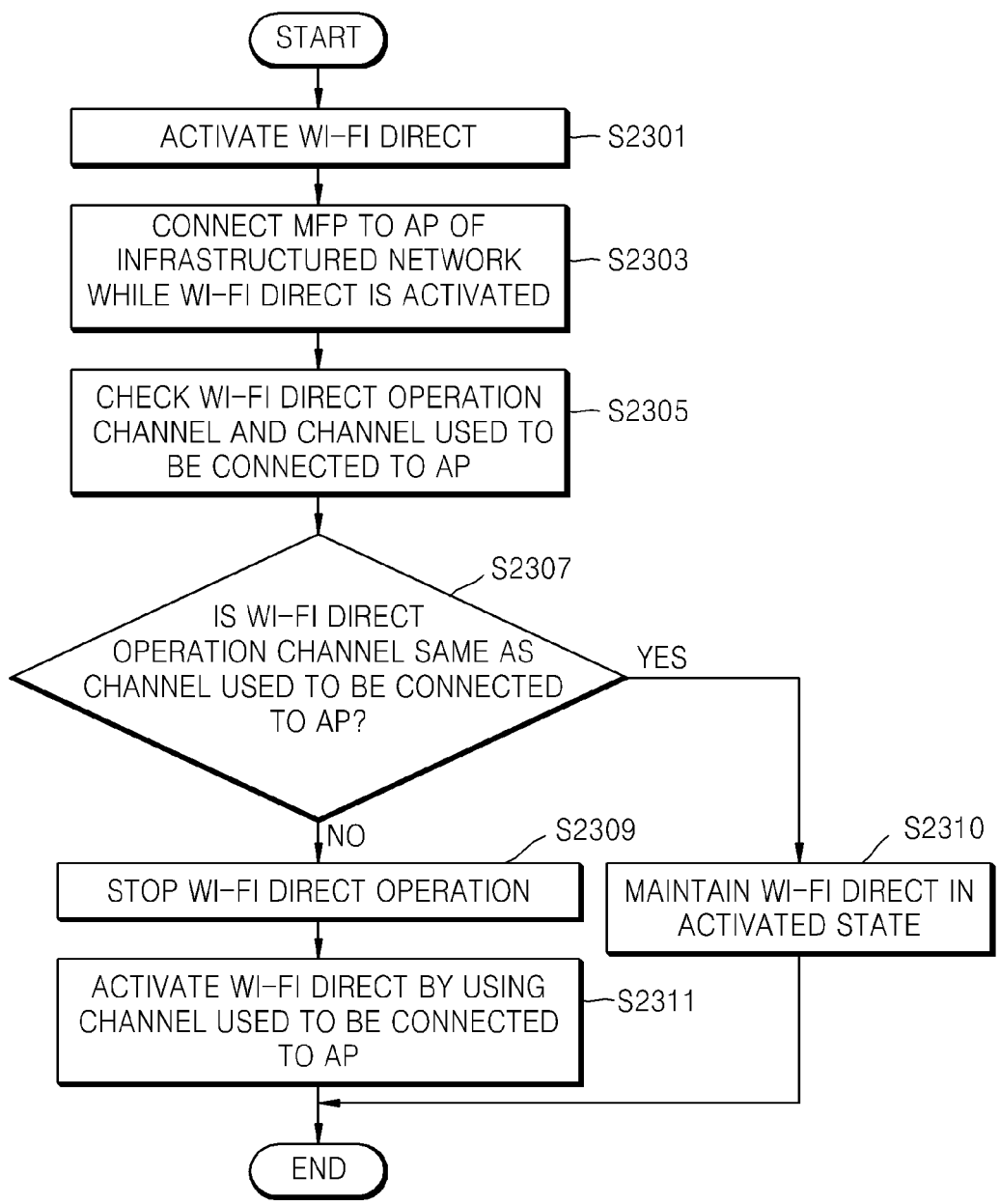

FIG. 23 is a flowchart for describing a method of setting the Wi-Fi Direct operation channel while the Wi-Fi Direct of the MFP is activated. Referring to FIG. 23, the Wi-Fi Direct of the MFP is activated in operation S2301, and the MFP is connected to the AP of the infrastructure network while the Wi-Fi Direct is activated, in operation S2303. The Wi-Fi Direct operation channel and the channel used to be connected to the AP are checked in operation S2305. It is determined in operation S2307 whether the Wi-Fi Direct operation channel is the same as the channel used to be connected to the AP. If it is determined that the Wi-Fi Direct operation channel is not the same as the channel used to be connected to the AP, the Wi-Fi Direct operation is stopped in operation S2309, and the channel that is used to be connected to the AP is set as the Wi-Fi Direct operation channel to activate the Wi-Fi Direct in operation S2311.

The above process will now be described in detail with reference to the software configuration of FIG. 16. If the MFP is connected to an AP that operates in channel 6 of 2.4 GHz when a Wi-Fi Direct operation channel is channel 1 of 2.4 GHz, the channel manager 1612b reads the channel of the connected AP from a wireless module via a WLAN library 1618, checks that the read channel is different from the Wi-Fi Direct operation channel, and informs a Wi-Fi Direct connection manager 1612a about the difference so as to change the Wi-Fi Direct operation channel to channel 6. The Wi-Fi Direct connection manager 1612a performs, by using the Wi-Fi Direct library 1607, preprocesses to change the Wi-Fi Direct operation channel (e.g., stopping of a soft AP, changing of an information element, and stopping of a device discovery operation), changes the Wi-Fi Direct operation channel to channel 6, and activates the Wi-Fi Direct.

In general, due to data transmission using one wireless antenna, a wireless MFP is structured to perform communications by using one communication channel. Accordingly, in a concurrent connection function to allow infrastructured network connection and Wi-Fi Direct connection at the same time, a problem may occur to use communication channels. When different channels are used to be connected to an infrastructured network and Wi-Fi Direct, if a CPU of a wireless chipset has a high performance, time may be divided and all packets may be processed by alternately using two channels, which causes a delay in a service of each channel and also causes another problem in terms of stability. However, in the above method of managing channels, according to an exemplary embodiment of the present general inventive concept, since a single channel is used to perform concurrent connection, the above problem may be prevented. Also, information on the channel of the AP of the infrastructured network may not be checked before the MFP is connected to the AP. However, according to an exemplary embodiment of the present general inventive concept, even when the Wi-Fi Direct is activated first and then the MFP is connected to the AP of the infrastructured network, since channel information of the AP is read and then the Wi-Fi Direct operation channel is correspondingly set, a single channel may be used.

A method of switching operation modes in a Wi-Fi Direct MFP will now be described in detail with reference to the accompanying drawings. Types of operation modes are described before the method of switching operation modes is described. WLAN modes of an MFP include an ad-hoc mode and an infrastructure mode. The ad-hoc mode refers to a mode in which the MFP is wirelessly connected to a wireless device by using ad-hoc communications, and the infrastructure mode refers to a mode in which the MFP is wirelessly connected to an AP of an infrastructured network.

Figure 24:
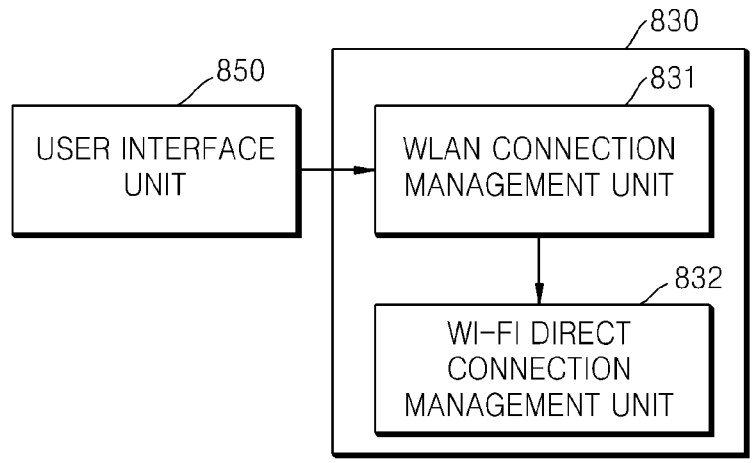
FIG. 24 is a block diagram of an MFP supporting Wi-Fi Direct, according to another exemplary embodiment of the present general inventive concept.

FIG. 24 is a block diagram of a Wi-Fi Direct MFP, according to another exemplary embodiment of the present general inventive concept. Referring to FIG. 24, the CPU 830 of FIG. 8 may include the WLAN connection management unit 831 and the Wi-Fi Direct connection management unit 832. Operations of the elements will now be described in detail with reference to FIGS. 25 through 27.

Figure 25:
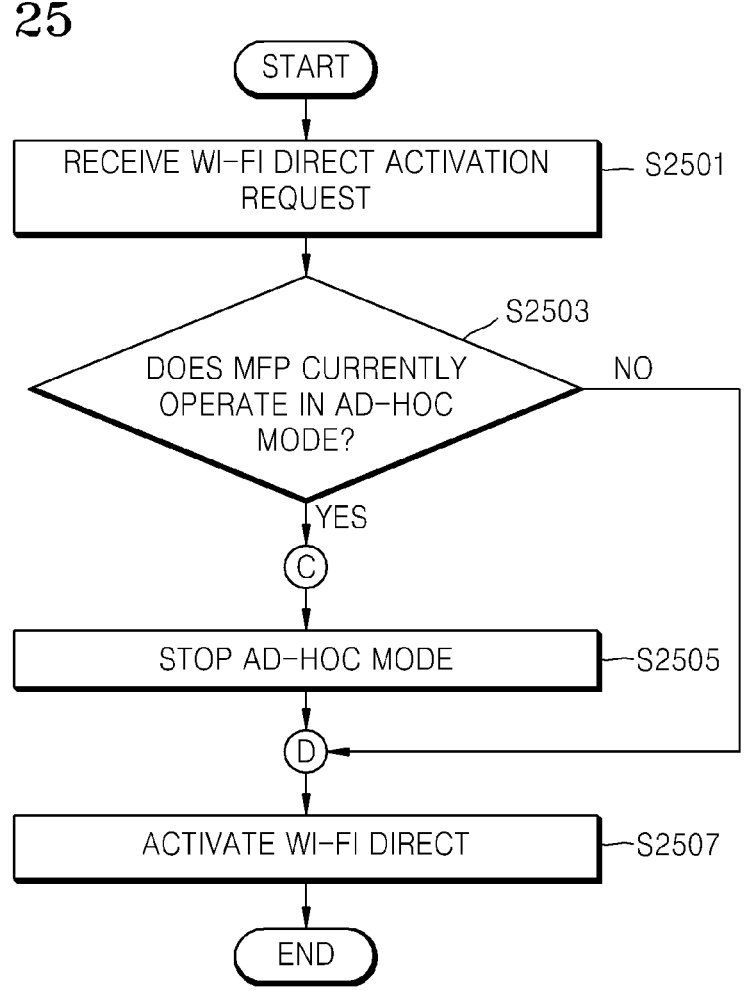
FIGS. 25 through 27 are flowcharts describing a method of switching operation modes in an MFP supporting Wi-Fi Direct, according to an exemplary embodiment of the present general inventive concept.
Figure 26:
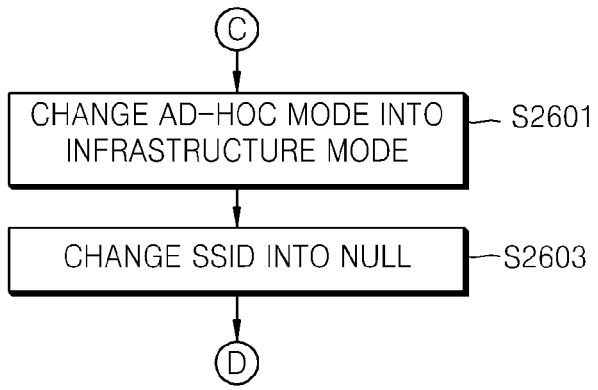
Figure 27:
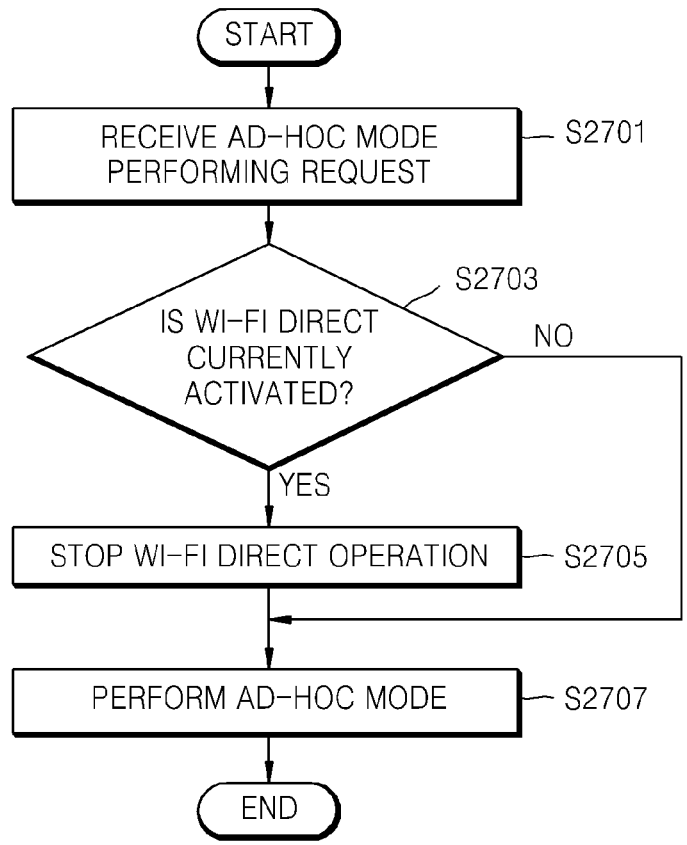

FIGS. 25 through 27 are flowcharts illustrating a method of switching operation modes in a Wi-Fi Direct MFP, according to an exemplary embodiment of the present general inventive concept. Referring to FIG. 25, if a Wi-Fi Direct activation request is received from a user via the user interface unit 850 in operation S2501, the WLAN connection management unit 831 determines in operation S2503 whether the MFP currently operates in an ad-hoc mode. If it is determined that the MFP currently operates in the ad-hoc mode, the WLAN connection management unit 831 stops the ad-hoc mode and requests the Wi-Fi Direct connection management unit 832 to activate Wi-Fi Direct in operation S2505. The Wi-Fi Direct connection management unit 832 activates the Wi-Fi Direct in operation S2507 according to the request. In this case, operation S2505 in which the WLAN connection management unit 831 stops the ad-hoc mode is illustrated in FIG. 26 in detail. Referring to FIG. 26, the WLAN connection management unit 831 may change an operation mode of the MFP from the ad-hoc mode into an infrastructure mode in operation S2601. In this case, the ad-hoc mode may be only stopped without changing the ad-hoc mode into the infrastructure mode. An SSID of the MFP set to perform the ad-hoc mode may be changed into null in operation S2603 in order to stop the ad-hoc mode.

Referring to FIG. 27, if an ad-hoc mode performing request is received via the user interface unit 850 in operation S2701, the WLAN connection management unit 831 determines in operation S2703 whether the Wi-Fi Direct of the MFP is currently activated. If it is determined that the Wi-Fi Direct of the MFP is currently activated, the WLAN connection management unit 831 requests the Wi-Fi Direct connection management unit 832 to stop the Wi-Fi Direct operation. As such, if the Wi-Fi Direct connection management unit 832 stops the Wi-Fi Direct operation in operation S2705, the WLAN connection management unit 831 performs the ad-hoc mode in operation S2707.

A Wi-Fi Direct technology supports a concurrent connection function to allow an infrastructured network connection and a Wi-Fi Direct connection to be performed at the same time, but may not support an ad-hoc mode and Wi-Fi Direct connection at the same time. In more detail, an ad-hoc mode ensures compatibility between devices when IEEE 802.11b is used, but Wi-Fi Direct does not support IEEE 802.11b. Accordingly, exemplary embodiments of the present general inventive concept address a method of selectively switching operation modes when a Wi-Fi Direct mode performing request or an ad-hoc mode performing request is received while operating in the ad-hoc mode or the Wi-Fi Direct mode.

As described above, if a response packet including an IP address of a P2P interface is transmitted to a wireless device P2P connected to an image forming apparatus, and an image forming operation is performed when an image forming operation performing request having the IP address of the P2P interface as a destination is received from the wireless device, the image forming apparatus may stably perform the image forming operation requested by the P2P connected wireless device while infrastructured network connection and P2P connection are achieved at the same time.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of performing a scanning operation in an image forming apparatus supporting Wi-Fi direct connection, the method comprising:
    receiving a discovery packet from a mobile device;
    transmitting a response packet to the mobile device in response to the discovery packet;
    transmitting to the mobile device an Internet Protocol (IP) address of a Wi-Fi direct connection interface via a Wi-Fi direct connection established by using connection information included in the response packet; and
    performing a scanning operation, and transmitting scan data to the mobile device in response to a scan request packet, which is received from the mobile device, the scan request packet having the IP address as a destination.

2. The method of claim 1, wherein the image forming apparatus supports an access point (AP) connection and Wi-Fi direct connection concurrently, and an IP address of an AP connection interface is different from the IP address of the Wi-Fi direct connection interface.

3. The method of claim 2, wherein the image forming apparatus operates as a group owner automatically for the Wi-Fi direct connection.

4. The method of claim 1, wherein the receiving of the discovery packet comprises receiving the discovery packet transmitted from the mobile device by using multicast or broadcast.

5. The method of claim 1, wherein the response packet comprises information on a service providable by the image forming apparatus.

6. A non-transitory computer readable recording medium having recorded thereon computer-readable codes to execute a method of performing a scanning operation in an image forming apparatus supporting Wi-Fi direct connection, the method comprising:
    receiving a discovery packet from a mobile device;
    transmitting a response packet to the mobile device in response to the discovery packet;
    transmitting to the mobile device an Internet Protocol (IP) address of a Wi-Fi direct interface via a Wi-Fi direct connection established by using connection information included in the response packet; and
    performing a scanning operation, and transmitting scan data to the mobile device in response to a scan request packet, which is received from the mobile device, the scan request packet having the IP address as a destination.

7. An image forming apparatus supporting Wi-Fi direct connection, the image forming apparatus comprising:
    a wireless local area network (WLAN) interface including a Wi-Fi direct connection interface for supporting Wi-Fi direct connection;
    a controller configured to control a scan operation via a Wi-Fi direct connection with a mobile device;
    a scanner configured to perform the scan operation,
    wherein the controller transmits a response packet to the mobile device in response to a discovery packet transmitted from the mobile device, transmits to the mobile device an Internet Protocol (IP) address of the Wi-Fi direct connection interface via the Wi-Fi direct connection and the scanner performs the scan operation and transmits scan data to the mobile device in response to a scan request packet, which is received from the mobile device, the scan request packet having the IP address as a destination.

8. The image forming apparatus of claim 7, wherein the WLAN interface supports an access point (AP) connection and Wi-Fi direct connection concurrently, and an IP address of an AP connection interface is different from the IP address of the Wi-Fi direct connection interface.

9. The image forming apparatus of claim 8, wherein the controller sets the image forming apparatus as a group owner automatically for the Wi-Fi direct connection.

10. The image forming apparatus of claim 7, wherein the WLAN interface receives the discovery packet transmitted from the mobile device by using multicast or broadcast.

11. The image forming apparatus of claim 7, wherein the controller generates the response packet to include information on a service providable by the image forming apparatus.

12. A method of receiving an image forming operation request through a peer to peer (P2P) connection in an image forming apparatus, the method comprising:
    releasing a connection between the image forming apparatus and an access point (AP) of an infrastructure network;
    P2P connecting the image forming apparatus to a wireless device;
    receiving a discovery packet from the wireless device via a P2P interface;

transmitting to the wireless device a response packet comprising an Internet Protocol (IP) address of the P2P interface;
receiving from the wireless device an image forming operation performing request having the IP address of the P2P interface as a destination; and
performing the requested image forming operation,
wherein the image forming apparatus operates as an access point by using a soft access point when the image forming apparatus is P2P connected.

13. The method of claim 12, wherein the receiving of the discovery packet comprises receiving via the P2P interface the discovery packet transmitted from the wireless device by using a multicast or broadcast method.

14. The method of claim 12, wherein the response packet transmitted to the wireless device further comprises information on services providable by the image forming apparatus.

15. The method of claim 12, wherein
the P2P connection is a Wi-Fi Direct connection, and
the P2P connecting of the image forming apparatus comprises P2P connecting the image forming apparatus to operate the image forming apparatus as a group owner (GO) and to operate the wireless device as a client.

16. The method of claim 12, wherein the receiving of the discovery packet is performed by using any one protocol from among Bonjour, Universal Plug & Play (UPNP), Web Server Director (WSD), Service Location Protocol (SLP), and Simple Network Management Protocol (SNMP).

17. The method of claim 12, wherein
if the image forming operation is a print operation, the receiving of the image forming operation performing request comprises receiving from the wireless device print data having the IP address of the P2P interface as a destination, and
the performing of the image forming operation comprises performing a print operation according to the print data.

18. The method of claim 12, wherein
if the image forming operation is a scan operation, the receiving of the image forming operation performing request comprises receiving from the wireless device a scan request having the IP address of the P2P interface as a destination, and
the performing of the image forming operation comprises scanning a document and transmitting scan image data to the wireless device.

19. The method of claim 12, wherein releasing the connection comprises:
determining whether the image forming apparatus is connected to the AP of the infrastructure network; and
releasing the connection between the image forming apparatus and the AP of the infrastructure network, if the image forming apparatus is connected to the AP of the infrastructure network.

20. A non-transitory computer readable recording medium having recorded thereon computer-readable codes to execute a method of receiving an image forming operation request through a peer to peer (P2P) connection in an image forming apparatus, the method comprising:
releasing a connection between the image forming apparatus and an access point (AP) of an infrastructure network;
P2P connecting the image forming apparatus to a wireless device;
receiving a discovery packet from the wireless device via a P2P interface;
transmitting to the wireless device a response packet comprising an Internet Protocol (IP) address of the P2P interface;
receiving from the wireless device an image forming operation performing request having the IP address of the P2P interface as a destination; and
performing the requested image forming operation,
wherein the image forming apparatus operates as an access point by using a soft access point when the image forming apparatus is P2P connected.

21. An image forming apparatus supporting a peer to peer (P2P) connection, the image forming apparatus comprising:
a wireless local area network (WLAN) interface adapted to P2P connect the image forming apparatus to a wireless device;
a controller adapted to receive at least one of an Internet Protocol (I)P address of a P2P interface and an IP address of an infrastructure network interface and to control performing of an image forming operation requested by the wireless device; and
an image forming operation performer comprising at least one of a scanner, facsimile, and a printer, adapted to perform the requested image forming operation under control of the controller,
wherein
if a discovery packet is received from the wireless device via the P2P interface, the controller is adapted to generate and transmit a response packet comprising the IP address of the P2P interface to the wireless device,
if an image forming operation performing request is received from the wireless device via the P2P interface, the controller is adapted to control the image forming operation performer to perform the requested image forming operation,
the WLAN interface releases a connection between the image forming apparatus and an access point (AP) of an infrastructure network, and P2P connects the image forming apparatus to the wireless device, and
the image forming apparatus further comprises a soft access point to allow the image forming apparatus to operate as an AP when the image forming apparatus is P2P connected.

22. The image forming apparatus of claim 21, wherein the WLAN interface is adapted to receive via the P2P interface the discovery packet transmitted from the wireless device by using a multicast or broadcast method.

23. The image forming apparatus of claim 21, wherein the controller is adapted to generate the response packet to further comprise information on services providable by the image forming apparatus.

24. The image forming apparatus of claim 21, wherein
the P2P connection is a Wi-Fi Direct connection, and
the WLAN interface is adapted to P2P connect the image forming apparatus to operate the image forming apparatus as a group owner (GO) and to operate the wireless device as a client.

25. The image forming apparatus of claim 21, wherein the WLAN interface is adapted to receive the discovery packet from the wireless device by using any one protocol from among Bonjour, Universal Plug & Play (UPNP), Web Server Director (WSD), Service Location Protocol (SLP), and Simple Network Management Protocol (SNMP).

26. The image forming apparatus of claim 21, wherein, if the image forming operation is a print operation, the controller is adapted to control the image forming operation performer to perform a print operation according to received print data if print data having the IP address of the P2P interface as a destination is received from the wireless device.

27. The image forming apparatus of claim 21, wherein, if the image forming operation is a scan operation, the controller is adapted to control the image forming operation performer to scan a document and to transmit scan image data to the wireless device if a scan request having the IP address of the P2P interface as a destination is received from the wireless device.

* * * * *